United States Patent [19]

Beall

[11] Patent Number: 4,549,966
[45] Date of Patent: Oct. 29, 1985

[54] METHOD OF REMOVING ORGANIC CONTAMINANTS FROM AQUEOUS COMPOSITIONS

[75] Inventor: Gary W. Beall, Austin, Tex.

[73] Assignee: Radecca, Inc., Austin, Tex.

[21] Appl. No.: 618,544

[22] Filed: Jun. 8, 1984

Related U.S. Application Data

[63] Continuation of Ser. No. 419,301, Sep. 20, 1982, abandoned, which is a continuation-in-part of Ser. No. 307,300, Sep. 30, 1981, abandoned.

[51] Int. Cl.$^4$ ............................................. C02F 1/28
[52] U.S. Cl. ..................................... 210/661; 210/670; 210/691; 210/908; 210/909
[58] Field of Search ............... 210/661, 670, 691, 694, 210/908–910, 924

[56] References Cited

U.S. PATENT DOCUMENTS

| | | | |
|---|---|---|---|
| 2,367,384 | 1/1945 | Tymstra et al. | 210/680 |
| 2,742,381 | 4/1956 | Weiss et al. | 210/661 |
| 3,763,040 | 10/1973 | Timpe et al. | 210/694 |
| 4,070,282 | 1/1978 | Otto | 210/694 |
| 4,351,978 | 9/1982 | Hatano et al. | 210/909 |

FOREIGN PATENT DOCUMENTS 920797 3/1963 United Kingdom .

Primary Examiner—Ivars Cintins
Attorney, Agent, or Firm—Stefan J. Klauber

[57] ABSTRACT

A method is provided of removing organic contaminants from an aqueous composition contaminated therewith. The method comprises contacting the aqueous composition with a sufficient amount of organoclay for a sufficient amount of time to absorb a substantial portion of the contaminant, and to form an aqueous organoclay admixture. The organoclay and aqueous composition are then separated from each other. The method is particularly useful for separating oily contaminants from water toxic substance precursors, e.g. humic acid and toxic organics (e.g. PCB) from water.

22 Claims, 17 Drawing Figures

FIG. 2    PCB Column Removal Study

FIG. 3  Column Removal of Dibromochloropropane From Water ns, and is
METHOD OF REMOVING ORGANIC CONTAMINANTS FROM AQUEOUS COMPOSITIONS

RELATED APPLICATIONS

This application is a continuation of application Ser. No. 419,301, filed on Sept. 20, 1982, which is a continuation-in-part of my copending application, Ser. No. 307,300, filed on Sept. 30, 1981, and entitled "ORGANOCLAY WASTE DISPOSAL METHOD", both now abandoned. The entire disclosure of this parent application is incorporated herein by reference.

BACKGROUND OF THE INVENTION

1. Field of the Invention

This invention relates to a method for removing organic contaminants from aqueous compositions, and is particularly useful in the treatment of waste fluid.

2. Prior Art

One of the major problem facing cities, chemical manufacturers, and industries using various chemicals, is waste disposal. More particularly, cities and industries are often faced with the disposal of aqueous compositions containing organic contaminants. Regulations make it impossible to simply dump such waste water into streams, even if such method of disposal were desirable. Various methods have been proposed for removing such contaminants from waste water, but they have been relatively expensive or inefficient. Therefore, the removal of contaminants from aqueous compositions, and in particular from waste water containing small amounts of contaminants, is a problem which has not been completely solved.

More particularly, municipal water treatment for removal of trihalomethanes (THM's) resulting from the chlorination of drinking water and organic contaminants in ground water is a major problem for most water systems in the United States. Currently, no economically satisfactory methods exist for removal of such organic moieties.

The issue of trihalomethanes as a focal point of chlorinated (or more appropriately halogenated) organic substances in public water supplies has been continuing for the past several years. Hundreds of research and review papers have been published on the subject and conferences have been held on chlorination, some proceedings of which have been published by Ann Arbor Science.

Much concern about the production of trihalomethanes, notably chloroform, dichlorobromomethane, dibromochloromethane, and, to a lesser extent, bromoform, in the process of disinfecting of drinking waters has resulted in the inclusion of monitoring for these compounds in proposed Federal drinking water standards. Also, a standard of 100 ug/L total trihalomethanes has been proposed (annual average) as well as requirements for the use of activated carbon to control the formation of trihalomethanes. Final acceptance of the primary drinking water regulations has been delayed partly by legal action to which the American Water Water Works Association (AWWA) has played a major role in opposition to the promulgated regulations.

The AWWA has maintained that insufficient scientific evidence has been produced to justify the use of alternative disinfection technology relative to the attendant loss in consumer protection; or to justify the costs associated with the proposed technology, basically, activated carbon for precursor (natural organic matter in water which is known to yield THMs upon contact with aqueous chlorine) removal. This approach in turn, is projected to be more efficient than removal of THMs after production. While other prevention/removal techniques are possible, their present technological feasability is not fully demonstrated and the associated economics do not presently justify their use.

Still further, all surface water sources (i.e. lakes and rivers) and some groundwater employed for industrial as well as municipal purposes, contain a certain amount of naturally occurring organics, commonly referred to as "humics." This naturally occurring humic portion is further divided into a humic and a fulvic acid portion. These moieties are not well defined, but in general the humic acid is composed of high molecular weight organic acids and the fulvic is considered to be the low molecular weight fraction. The humic contained in natural waters presents two types of problems, one in the industrial sector, the other in the municipal drinking water area.

The problems associated with humics in industrial feed waters is related to their effect on the life time of anion exchange resins employed to soften boiler feed water. The anion exchange resins are extremely expensive; their fouling by humics increases operation costs significantly. There is, therefore, a need for a pretreatment to remove humics.

Further, chlorination of drinking water has long been a method used to prevent the transmission of disease from contaminated water. However, chlorination of waters containing bromide ion and natural organic compounds results in the production of chloro- and brom-organic compounds. It is now generally accepted that the chlorination of natural waters containing humic and fulvic acids produces not only volatile trihalomethanes (THMs), but also many other chlorinated aliphatic and aromatic compounds. The THMs are potentially carcinogenic compounds and the EPA has proposed a maximum level of 100 ug/L of total THMs in drinking waters. The toxicity of the less volatile halogenated organics has not been established; however, there has been concern over their potential activity.

Many different methods, such as macroreticular resins and granulated charcoal, have been tried to remove either the precursors of, or the halogenated organic compounds themselves, but such methods have only had limited success.

There exists numerous methods for removing organic contaminants from aqueous compositions, typically oil and water emulsions, see for example the following relevant U.S. Patents:

U.S. Pat. No. 2,367,384 to Tymstra;
U.S. Pat. No. 2,937,142 to Rios;
U.S. Pat. No. 3,196,619 to Shock;
U.S. Pat. No. 3,487,928 to Canevari;
U.S. Pat. No. 3,528,284 to Skoglund et al;
U.S. Pat. No. 3,986,953 to Beaucaire;
U.S. Pat. No. 4,231,866 to Moser et al; and
U.S. Pat. No. 4,279,756 to Weiss et al More specifically, Tymstra describes a method for removing small quantities of water-immiscible organic oily impurities from water. The method consists of contacting the oily composition with an inert solid coated with a cation surface-active bonding agent. The solid employed may be beach sand, mud flat deposits, silt, clay, limestone, silica, rice hulls, etc. The cationic surface-active bonding agent may be quaternary ammonium, phosphonium, arsonium, or primary, secondary, or tertiary organic amines or salts thereof. This reference does not teach or suggest the use of the specific organoclays utilized herein to remove organic contaminants from aqueous compositions, nor the unexpected efficiencies of these clays.

Rios separates phenolic substances from aqueous solutions by contacting the aqueous solution with a clay adsorbent. The clay is previously treated by depositing carbonaceous material thereon, and then subjecting it to combustion regeneration to burn off the carbonaceous material.

Canevari separates droplets of oil from an aqueous phase, using a mixture comprising a sodium montmorillonite clay and an organic cationic agent or glycol. The organic cationic agent is preferably an amine. The mixture is applied as a flocculating clarifying solution containing from 1 to 5% of clay to water, and an effective amount of the organic cationic agent or glycol.

Beaucaire describes breaking an oil-water emulsion with waste-pickling acid solution, and thereafter converting the iron ions present in the waste-pickling solution to magnetite particles which absorb the oil. The magnetite particles and oil absorbed thereon are separated from the solution leaving a clarified solution.

Moser et al separates organic and aqueous phases by treatment of the emulsions with diatomaceous earth at an elevated temperature.

Weiss et al describes the use of a finely divided particulate mineral or clay material, the individual particles of which have been treated to produce a thin hydroxylated surface layer having a positive zeta potential at the adsorption pH.

None of the aforementioned references teach or suggest the use of organoclays to remove organic contaminants from water.

Additionally, organoclays are well-known in the art, see for example the following U.S. patents:
  U.S. Pat. No. 2,531,427 to Hauser;
  U.S. Pat. No. 2,966,506 to Jordan;
  U.S. Pat. No. 3,422,185 to Kuritzkef;
  U.S. Pat. No. 3,974,125 to Oswald;
  U.S. Pat. No. 4,081,496 to Finlayson; and
  U.S. Pat. No. 4,105,578 to Finlayson et al None of these aforementioned references teach or suggest the use of these organoclays to remove organic contaminants from water.

SUMMARY AND OBJECTS OF THE INVENTION

A method is provided for removing organic contaminants from an aqueous composition contaminated therewith. The method comprises contacting the aqueous composition with a sufficient amount of organoclay for a sufficient amount of time to absorb a substantial portion of the contaminant, and to form an aqueous organoclay admixture. The organoclay and aqueous composition are then separated from each other. The method is particularly useful for separating oily contaminants from water and toxic substance precursors, e.g. humic acid and other toxic organics (e.g .PCB's) from water.

DETAILED DESCRIPTION OF THE INVENTION

Figure 1:
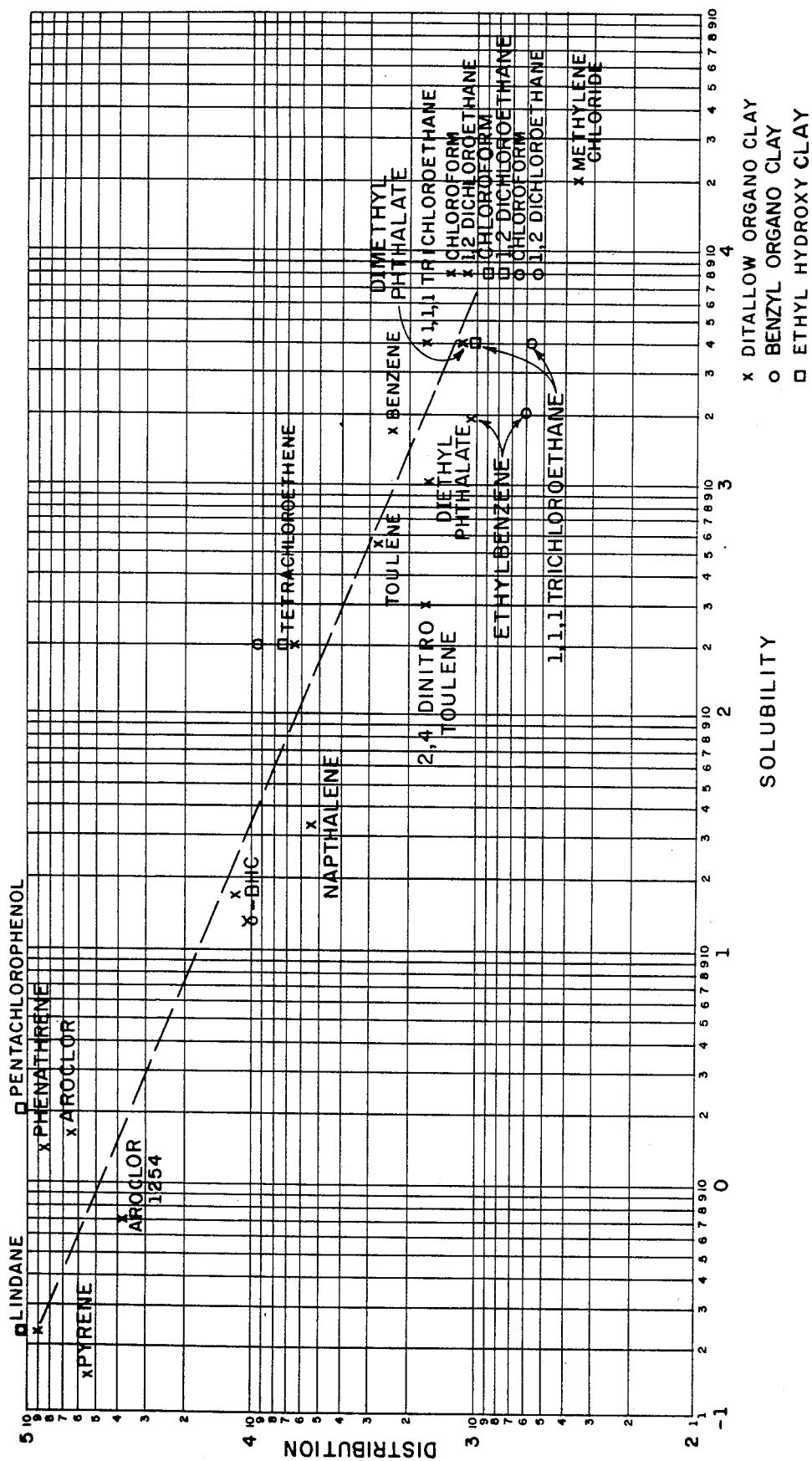
FIG. 1 shows the relationship of the logarithm of the distribution co-efficient of certain organic contaminants with the logarithm of their solubilities in water.

Organoclays are well known in the art as exemplified by the aforementioned patents to Hauser, Jordan, Kuritzkef, Oswald et al, Finlayson, and Finlayson et al, the entire disclosures of which are incorporated herein by reference. In this invention, the term "organoclay" refers to various clay types, e.g. smectites, that have organo ammonium ions substituted for cations between the clay layers. The term "organo ammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite type clays, particularly the smectite type clays which have a cation exchange capacity of at least 75 millequivalents per 100 grams of clay. Useful clays for such purposes include the naturally occuring Wyoming variety of swelling bentonite and similar clays, and hectorite, which is a swelling magnesium-lithium silicate clay. The clays, are preferably converted to the sodium form if they are not already in this form. This can be effected, by a cation exchange reaction with a soluble sodium compound. These methods are well-known in the art. Smectite-type clays prepared synthetically can also be utilized, such as montomorillonite, bentonite, beidelite, hectorite, saponite, and stevensite.

The organoclays useful in this invention include those set forth in U.S. Pat. No. 2,531,427 to Hauser. These organoclays are modified clays which exhibit in organic liquids, some of those characteristics which untreated clays exhibit in water. For example, they will swell in many organic liquids and will form stable gells and colloidal dispersions.

Generally, the quaternary ammonium salt substituted onto the clay has organic groups attached to the clay which will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e. dimethyl dioctododecyl 0:2, methyl benzyl dioctododecyl 1:2, dibenzyl dioctobenzyl 1:1, tribenzyl octadecyl 3:1, methyl dibenzyl octodecyl 2:1). The amount of alkyl ammonium salt substituted on the clay can vary between 0.5% to 50%.

In particular the preferred organoclay used in this invention comprises one or more of the following quaternary ammonium cation modified montmorillonite clays:

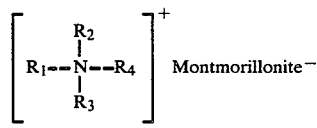

wherein $R_1$ is an alkyl group having at least 10 carbon atoms and up to, for example, 24 carbon atoms, and preferably having a chain length of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(-hydrogenated tallow) ammonium bentonite; and more generally quaternary ammonium cation modified montmorillonite clays represented by the formula:

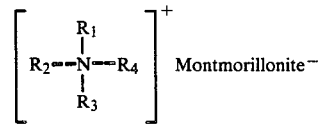

wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, and most preferably wherein 20% to 35% of said long chain alkyl radicals contain 16 carbon atoms and 60% to 75% of said long chain alkyl radicals contin 18 carbon atoms.

The montmorillonite clays which may be so modified are the principal constituents of bentonite rock, and have the chemical compositions and characteristics described, for example, in Berry and Mason, "Mineralogy", 1959, pp. 508–509. Modified montmorillonite clays of this type (i.e. organoclays) are commercially available from Southern Clay Products, Inc., Gonzales, Texas under such trade designations as CLAYTONE 34 and 40, and are available from NL Industries, Inc., New York, N.Y. under such trade designations as BENTONE 27, 34, and 38. The preferred organoclays utilized in this invention, are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methyl bis(2-hydroxyethyl)octodecyl ammonium bentonite.

The aqueous composition treated in this invention contain an amount of organic contaminant. Typical organic contaminants are the chlorinated organic compounds, e.g. DDT, BDD, DDE, 2,4-dichlorophenol, tetrachloroethylene, and polychlorobiphenyl contaminants and other organics such as benzene, toluene, methylene chloride, chloroform, 1,2 dichloroethane, 1,1,1-trichloroethane, trichloroethylene, tetrachloroethylene, 2-nitrophenol, pentachlorophenol, dimethy phthalate, Lindane, Arochlor-1254, ethyl benzene, HCP, parathion, dichlorobenzene, hexachlorocyclopentadiene, ethylparathion, 2,4-dinitrotoluene, naphtalene, pyrene, oils, humic acid and other toxic substance precursors, dibromochloropropane (DBCP), and organics chelated with metals, The latter mentioned chelated metal is a metal that has formed a complex with an organic molecule. These complexes are quite inert to normal chemical reactions.

In the method of this invention, a sufficient amount of the organoclay is contacted with the aqueous composition to absorb substantially all of the organic contaminants on the organoclay.

The capacity for sorption of organics by the organoclays is from about 20% to 250% of the weight of the organoclay. The amount of organoclay utilized may thus range from about 40% to 500% by weight of the amount of organic contaminants.

The organoclay is thoroughly contacted with the aqueous composition. The temperature at which the organoclay is mixed with the waste is not critical, however, optimum removal efficiences are found in the range of 40° to 50° C. The contact time is an amount of time sufficient to absorb the contaminant on the organoclay, and generally ranges from about 10 seconds to about 10 minutes, depending on the amount of organoclay, particle size, type, fluid velocity, etc.

The organoclay, upon contact with the aqueous composition, swells as the organic contaminant molecules are sorbed into and onto the organoclay. The organoclay additionally fixes the organic contaminant compounds through absorption involving partitioning of the organic molecules of the contaminant into the organoclay.

The organic molecules of the contaminant preferably partition into the organic phase of the organoclay versus the aqueous phase or polar fluid phase of the fluid. The magnitude of organic partitioning of a given organic molecule into the organoclay over, for example, the aqueous phase can be predicted qualitatively by the solubility of the organic molecule in the aqueous phase. That is to say, an organic molecule that is very insoluble, e.g. oil, in an aqueous phase will partition very strongly into the organoclay relative to a more soluble organic molecule. This partitioning phenomenom also follows chromatographic theory which allows precise predictions of how organic molecules will migrate through a bed of organoclay. FIG. 1 shows the linear relationship of distribution coefficients for several key organic species with three types of organoclay. The distribution coefficients equal the amount of organic adsorbed in the clay divided by the amount left in solution times the volume of the solution divided by the mass of the clay. The aqueous solution contains the organics listed in FIG. 1. Generally, the amount in solution depends on solubility.

Several methods of contacting the organoclay with the contaminant containing aqueous composition include flow through columns and batch methods. The column method involves passing the aqueous composition through a packed column of organoclay. Another method is to contact the organoclay with the aqueous composition in a fluidized bed manner, i.e. an upflow of the aqueous composition through a bed of organoclay. Additionally, stirred beds of organoclay may be contacted with the aqueous composition.

The organoclay may be mixed with a particulate diluent such as anthracite or may be utilized alone. Such methods of contacting particulate substances are well-known in the art, see, for example, the activated charcoal art.

In a batch method of contacting the organo-clay with the aqueous composition, the organoclay is added to the aqueous composition as a finely divided powder and after a sufficient amount of time is removed by the well-known methods of filtration, flocculation, flotation or centrifugation. In this mode of operation, the organic contaminants are sorbed on the organoclay and removed from the solution or the aqueous composition when the organoclay is physically removed.

The organoclays may be used to remove natural organics from water destined for use as drinking water. This is particularly important in areas where chlorination is the method employed for disinfection. When chlorine is employed for this purpose, the natural organics are chlorinated to form a family of compounds called trihalomethanes (THM) which have been shown to be carcinogens. Removal of these organics from industrial boiler feed water is also important in lowering the cost of water softening since these organics will foul anion and cation exchange resins employed in the softening process.

Another area of great importance for the application of organoclays is for removal of organics from water wherein the organic is an oil. This problem appears in several major industrial sectors including oily condensate at petrochemical plants, oil emulsions utilized in rolling mills or machine shops using cutting oils, oil in water compositions at oil wells, and oil coming from power plants and other industrial plants.

Industrial chelated metals and solutions containing the chelated metals may be pumped through columns or filters of organoclay. These columns can be either disposed of as a waste or the metals extracted for their use, since they have been highly concentrated.

The method of this invention thus provides several advantages one of which is an economical method of removing organic contaminants from aqueous compositions. This yields substantial savings in disposal of the water and/or permits the water to be returned to the plant for further use. The organic contaminants/organoclays may be regenerated or incinerated.

The following nonlimiting examples illustrate several embodiments of the method of this invention.

EXAMPLE 1

Figure 2:
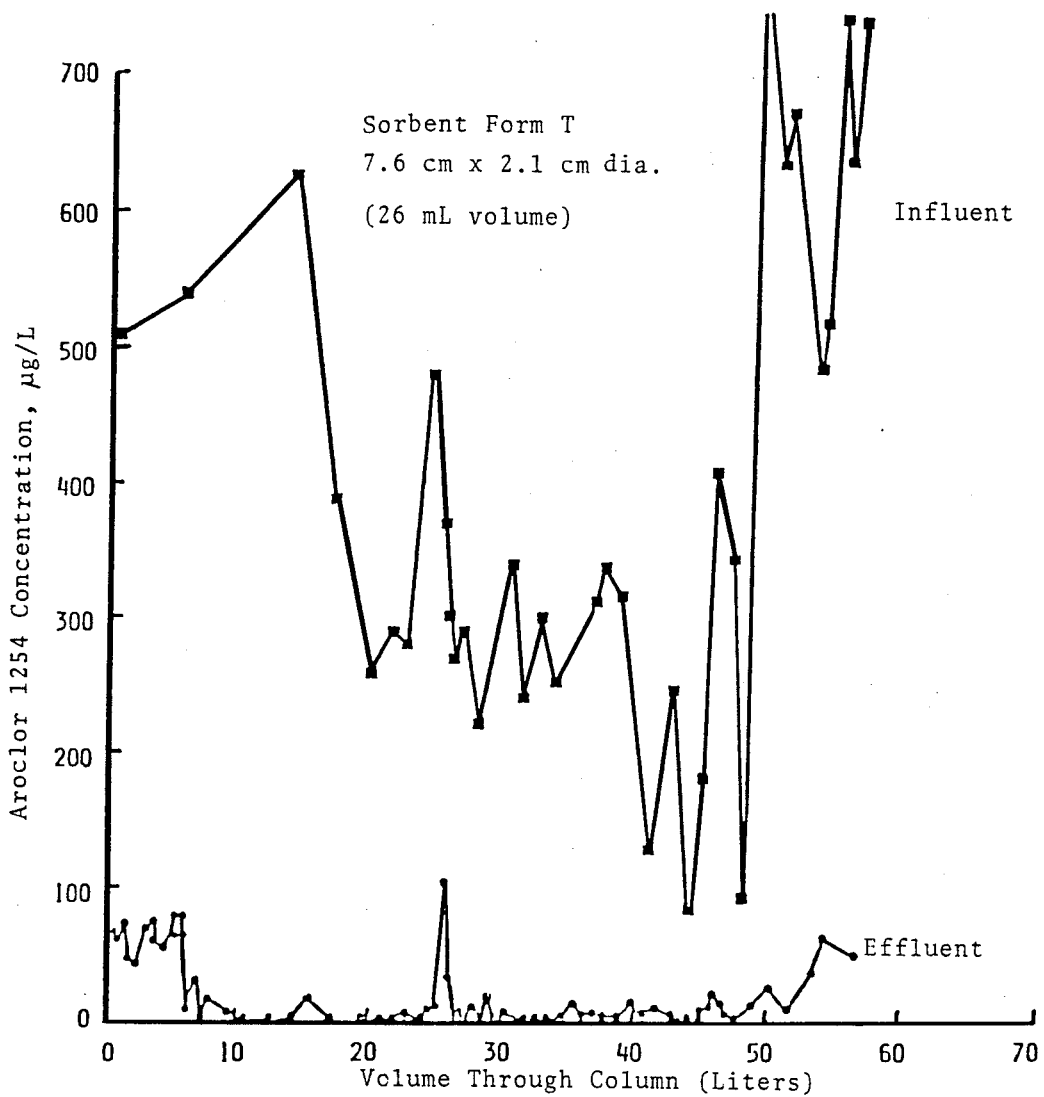
FIG. 2 shows PCB column removal as described in Example 1.

A small column of 2.1-cm diameter by 7.6 cm in height was employed to remove PCBs (polychlorobiphenyls) from water. The effluent and influent concentrations of PCB are given in FIG. 2. It can be seen that the organoclay is very effective at removing the PCB from solution, with wide variation in influent concentration.

Figure 3:
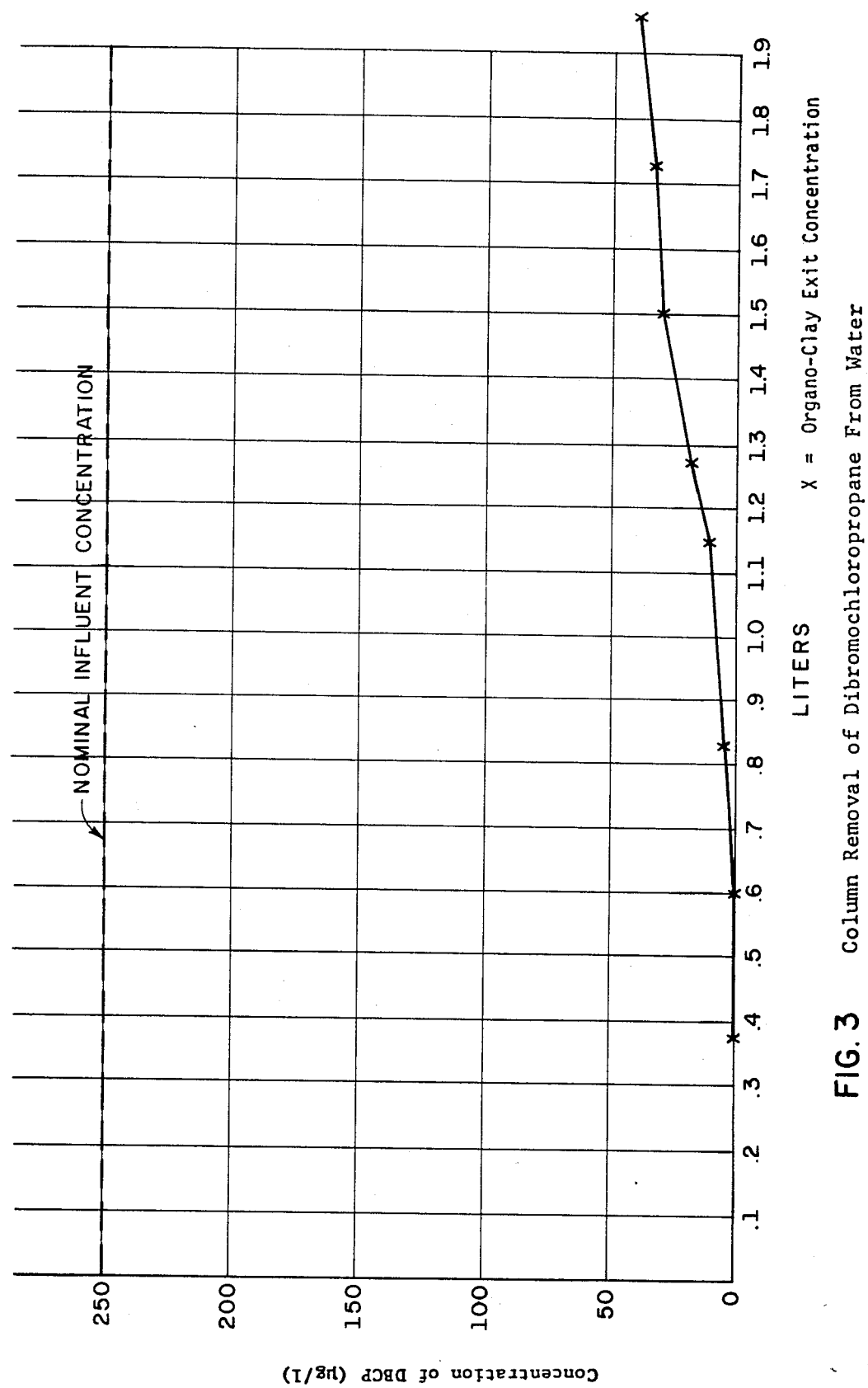
FIG. 3 shows column removal of dibromochloropropane from water as described in Example 1.

A similar example is given in FIG. 3 for the removal of dibromochloropropane from water. Again the removal of DBCP is quite efficient.

Both of these compounds are carcinogenic and their removal from water is a major concern. The organoclay utilized in both tests was dimethyl di(hydrogenated tallow)ammonium bentonite (occasionally referred to herein as "Form T").

EXAMPLE 2

This is an example of the removal of oil from oily condensate in a laboratory, pilot, and full scale plants at a petrochemical plant in Texas.

Laboratory

At the laboratory scale, a plexiglass column was used measuring $1\frac{3}{4}$ inch I.D. and $2\frac{1}{4}$ inch O.D. and a length of 1 foot. In the experiment, a concentration of 2,000 ppm oil in water (Gulf Senate 460) was used to create a "worst-case" situation and to obtain a loading capacity for the pure sorbent. The organoclay—dimethyl di(hydrogenated tallow)ammonium bentonite (Form T)—was sieved to a 24–60 mesh size. The column was packed using rubber stoppers at each end with a teflon plate inserted at the bottom of the column so as to prevent the sorbent from escaping. A peristaltic pump was used and a pressure gauge inserted so that a pressure drop could be monitered during the course of the run. The flow rate through the column was initially set at 120 ml/min which corresponds to approximately 2 gpm/ft$^2$. The column was not completely filled with sorbent to allow for swelling; and the sorbent was fluidized in the column with water before the run was initiated.

An effluent sample was taken after each gallon to be analyzed for oil and grease. The influent was also sampled three times during the course of the run to document the concentration. As the oily condensate composition was pumped through the column, a "wave front" moved through the sorbent as its absorption capacity for the oil was saturated. Also, the initial zero pressure had increased to 8 psi after five gallons and to 30 psi after twelve gallons, with a corresponding flow rate of 80 ml/min. which was rapidly decreasing. After fifteen gallons, the run was terminated. Removing most of the top layer of oil and sorbent did not alleviate the pressure problems. The final pressure was 48 psi and the flow rate was 40 ml/min. The effluent was still clear at the end of the run and approximately one inch of sorbent appeared unspent.

The majority of the samples were analyzed for oil and grease gravimetrically; however, a portion were analyzed using a Turner fluorimeter. These results appear in Table 1.

TABLE 1
LABORATORY COLUMN STUDY - ORGANOCLAY COLUMN - 2000 PPM INFLUENT

| Sample Volume | ppm Oil |
|---|---|
| *Gravimetric Determination[1]* | |
| 1 Gallon | 3.5 |
| 2 Gallon | 1.7 |
| 3 Gallon | 3.0 |
| 4 Gallon | <1 |
| 5 Gallon | <1 |
| 6 Gallon | 1.3 |
| 7 Gallon | <1 |
| 8 Gallon | 4.0 |
| 14 Gallon | 2.3 |
| 15 Gallon | 3.4 |
| Influent #1 | 2310 |
| Influent #2 | 2470 |
| Influent #3 | 2280 |
| *Fluorimetry Determination* | |
| 9 Gallon | <1 |
| 10 Gallon | <1 |
| 11 Gallon | <1 |
| 12 Gallon | <1 |
| 13 Gallon | <1 |

[1] The standard deviation on this analysis is ±4 ppm.

Pilot

The initial test of a 4-inch diameter backwashable pilot unit containing the same organoclay as the laboratory unit employed a mixture of 15% organoclay/85% anthracite. The column was 10 inches high and was run at 6.5 gpm/ft$^2$ at an influent concentration of nominally 5 ppm oil. The column was run for 26 days. The pressures, flow rates, and oil content of the effluent are give in Table 2.

TABLE 2
RESULTS FROM BACKWASHABLE PILOT UNIT

| Day | Time | Flow Rate (gpm/ft$^2$) | Pressure (psig) | ppm Oil |
|---|---|---|---|---|
| 1 | 3:00 PM | 6.5 | 7.0 | 0.8 |
| | Unit was started. Backwash performed well. | | | |
| 2 | 8:00 AM | 6.5 | 7.0 | 0.8 |
| | 11:00 AM | 6.5 | 1.0 | 0.75 |
| 3 | 8:30 AM | 6.5 | 1.0 | 0.4 |
| 6 | 10:30 AM | 6.5 | 3.0 | 1.2 |
| | 1:30 PM | 6.5 | 5.0 | 0.8 |
| | 1:35 PM | Unit was backflushed. Pressure was down below 0. | | |
| | 1:35 PM | 6.5 | 0.0 | 1.2 |
| 7 | 8:30 AM | 6.5 | 0.5 | 0.8 |
| | 8:30 AM | 3.2 | 1.0 | 0.15 |
| | Increased to 6.5 and then took sample. | | | |
| 8 | 2:30 PM | 6.5 | 0.0 | 0.8 |
| 9 | 8:30 AM | 6.5 | 0.0 | 0.6 |
| 10 | 8:30 AM | 6.5 | 0.0 | 0.5 |
| 13 | 10:30 AM | 6.5 | 0.0 | 0.8 |
| 14 | 9:00 AM | 6.5 | 0.5 | 0.8 |
| 15 | 9:00 AM | 6.5 | 0.5 | 0.8 |
| 16 | 9:00 AM | 6.5 | 0.5 | 0.8 |
| 20 | 8:30 AM | 6.5 | 0.5 | 0.8 |
| 21 | 8:30 AM | 6.5 | 0.5 | 1.25 |
| | Unit was backwashed. | | | |
| | 2:30 PM | 6.5 | 0.0 | 0.8 |
| 22 | 9:00 AM | 6.5 | 0.0 | 0.8 |
| 23 | 8:30 AM | 6.5 | 1.0 | 0.8 |
| 24 | 9:00 AM | 6.5 | 0.0 | 0.8 |
| 27 | — | — | — | — |

Full Scale

The final experiments were conducted at full scale. The same organoclay was mixed with anthracite in a 1:3 ratio and was loaded into a seven-foot diameter column with a bed depth of 18 inches. The unit was run for 50 days. The influent concentration of oil was approximately 4 ppm but varied from 2 to greater than 25. The normal flow rate was 6.5 gpm/ft$^2$ but went as high as 9.75 gpm/ft$^2$. The effluent averaged 0.6 ppm with the highest value of 4.0 ppm during extreme upsets in both flow rate and oil concentration.

It is clear from these examples that organoclays can be utilized very effectively to remove oil from water.

EXAMPLE 3

All of the aforedescribed examples of applications of the organoclay for removal of organics from water have been of the column type. An example of organoclay applied to removal of organics from water in a batch mode is the injection of organoclay into a disolved air flotation unit (DAF). These devices employ microscopic air bubbles to float suspended or colloidal particles from solution. These devices remove gross amounts of oil from water.

Table 3 contains results for removal of oil from oily condensate in a 600 gpm DAF with/influent oil concentration of approximately 60 ppm. The organoclay dose was about 90 ppm.

TABLE 3
REMOVAL OF OIL IN A FULL SCALE DAF UNIT

| Time of Day | DAF Effluent Oil Concentration (ppm) |
|---|---|
| 9:00 p.m. | 2 |
| 12:01 a.m. | 0.8 |
| 1:00 a.m. | 0.8 |
| 3:00 a.m. | 0.5 |
| 5:00 a.m. | 0.5 |
| 7:00 a.m. | 0.6 |

Normal DAF operation, using standard floculation methods, yields effluent of 3 to 4 ppm oil. This would indicate superior removal by utilizing organoclay.

EXAMPLE 4

Analytical Procedures

Form T—dimethyl di(hydrogenated tallow)ammonium bentonite organoclay was used in experiments designed to observe removal of humics and other natural organics from various water sources. A column of 2.1 cm internal diameter×8.1 cm in length was slurry-packed with unsieved organoclay for commercial humic absorption studies. The commercial humic, Chemelog Lot No. 106774, was dissolved in low organic water at a concentration of approximately 86 mg/liter. The low organic water was prepared by taking deionized water and distilling it from a basic potassium permanganate solution.

A flow rate of approximately 2 mL/min (0.14 gallon per minute/ft$^2$) was used for the commercial humic study. Fractions of approximately 20 to 25 mL each were collected in test tubes using a Buchler Model 200 fraction collector. The volume and humic acid concentration by flourescence were measured for each tenth tube and an average volume for the ten tubes was calculated.

The humic acid concentration from the column was followed by the use of a Turner fluorometer. The excitation filter used was Corning #7-60 which has a maximum at approximately 360 nm. The emission filter used was a #48 with a maximum of approximately 465 nm. A series of solutions of known concentrations of humic acid were prepared and a standard fluorescence curve was generated. This curve was found to be linear across the humic acid concentration range of 10 mg HA/L to 0.5 mg HA/L water.

Every one-hundredth fraction from the commercial humic was collected and retained for total trihalomethane (THM) analysis. Total THM analyses were performed by chlorinating the collected fractions at 10 mg/L Cl with a chlorine solution of known concentration. The chlorine solution was prepared by bubbling chlorine gas through a basic water solution. Standardization of the chlorine solution was by ASTM Method 114A, Iodometric Method. Chlorinated samples were allowed to incubate at room temperature seven days prior to anaylsis. The THM's were analyzed by GH/Hall detector using the purge and trap methodology. All THM samples are quenched with sodium thiosulfate prior to being analyzed.

In order to test the validity of the measurements employing synthetic humic waters, several natural waters containing large amounts of humics were obtained. These waters included Black lake water from Virginia, three groundwaters from Miami, Florida, and a tap water sample from Miami, Florida.

Identical columns of 2.1 cm internal diameter×4.2 cm length of Form T organoclay were slurry packed for each of the five natural waters. Each was washed with from 2 to 4 liters of organic-free water prior to starting the sample water. A sorbent particle size of 50 to 120 mesh was used for Preston Groundwater #1 and Black Lake Water. Flow rate through these two columns was 2 mL/min or 0.14 gpm/ft$^2$. Particle sizes of the sorbent used for the Florida Tap, Preston Groundwater #2 and Resources Reclamation Groundwaters were 60 to 120 mesh. The flow rate through these three columns was 3 mL/min or 0.21 gpm/ft$^2$. The Florida water (Preston Groundwater #1) and Black Lake Water were chlorinated at 10 mg/L and 50 mg/L Cl, respectively. The remaining three waters were not chlorinated, but the Preston Groundwater #2 and Resources Reclamation Groundwaters were chlorinated at the 20 mg/L Cl level or higher.

Fluorescence measurements and other conditions for the natural waters were the same as those reported for the humic acid study.

RESULTS AND DISCUSSIONS

Synthetic Humic Solution

A synthetic humic solution was prepared by dissolving a known quantity of commercially available humic in organic-free water. This solution was then used to determine the feasibility of humic acid removal by Form T organoclay. A column of unsized organoclay was slurry-packed in water and rinsed well with organic-free water before the humic solution was passed through the column.

The humic solution was passed through the sorbent column at approximately 2 mL/min continuously for several weeks. The empty bed volume of the column was approximately 26 mL allowing for calculation of the number of column volumes passed through the column. Fluorescence measurements were made at regular intervals on column effluent in order to follow the breakthrough of the humic acid.

Figure 4:
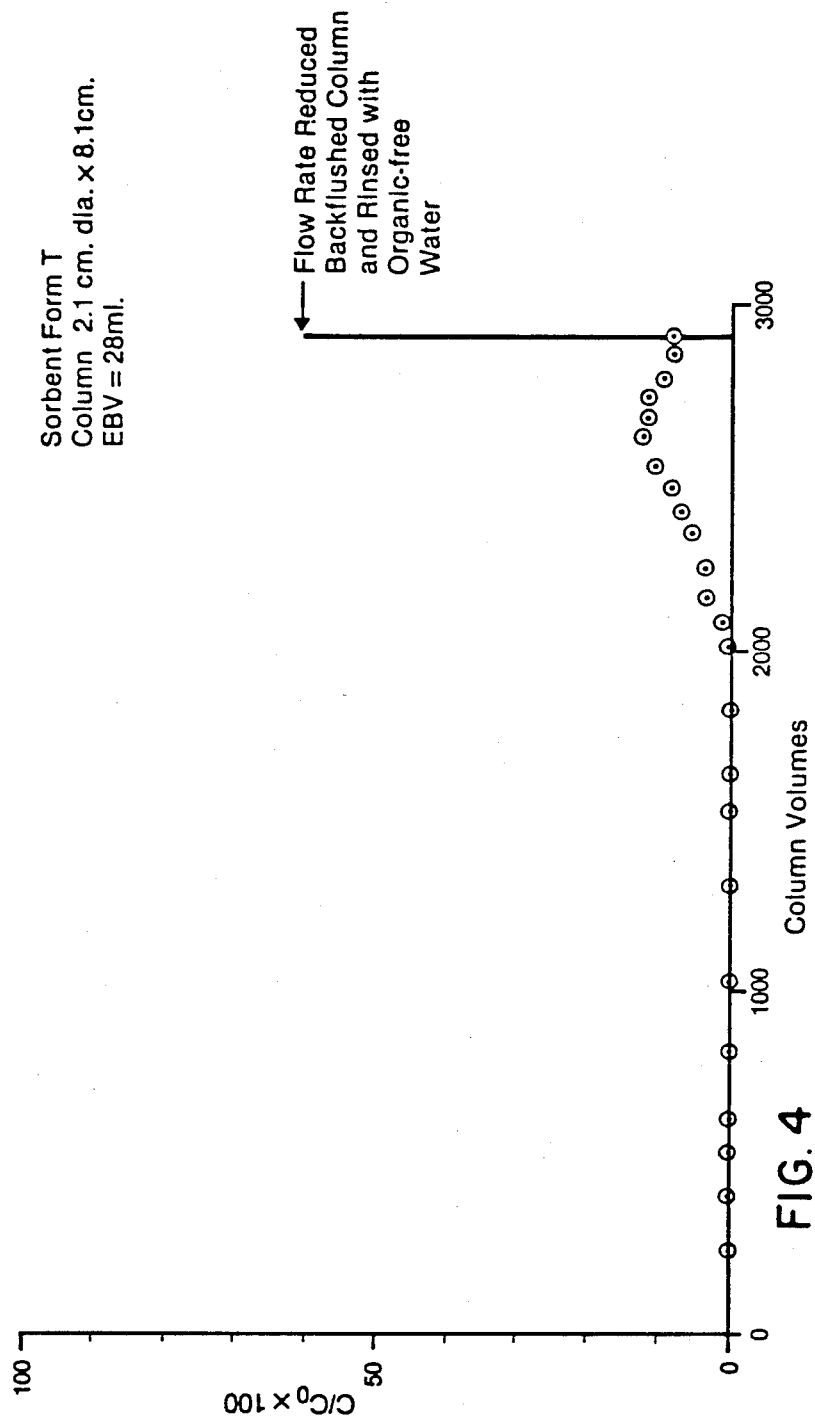
FIGS. 4 and 5 are commercial humic fluorescence breakthrough before and after backflush (Example 4)

The results of the humic acid breakthrough study are shown in FIG. 4. The maximum fluorescence breakthrough observed was 13 percent of the initial concentration at approximately 2800 column volumes. The column was observed to become increasingly darker as humic acid accumulated on the sorbent.

At 2905 column volumes, the humic acid flow was discontinued due to severe flow reduction. The column was backflushed and rinsed with organic free water before resuming the humic flow. The level of fluorescence in the organic-free water rinse was not observed to go quickly to zero indicating the humic acid was not being removed from the sorbent.

Figure 5:
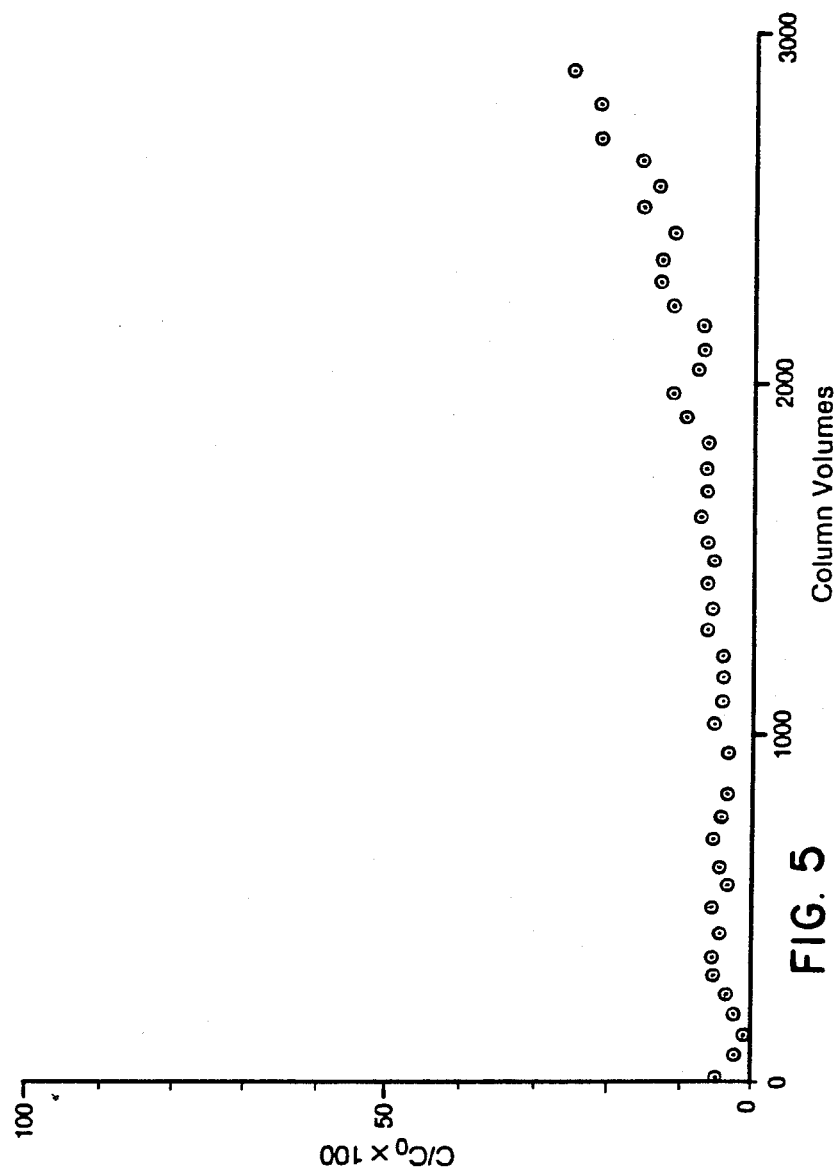

The flow characteristics were restored by the backflush and the humic water flow resumed. The fluorescence breakthrough after treating the column is shown in FIG. 5. The level of fluorescence was never zero again again but stayed constant at about five percent up to 2000 column volumes. At this point, the level slowly began to rise to a maximum of about 25 percent breakthrough at 2900 column volumes at which point the flow was discontinued. Again, the column was observed to be very dark with the absorbed humic acid, and flow was restricted. The level of removal is extremely high in comparison to activated charcoal.

Figure 6:
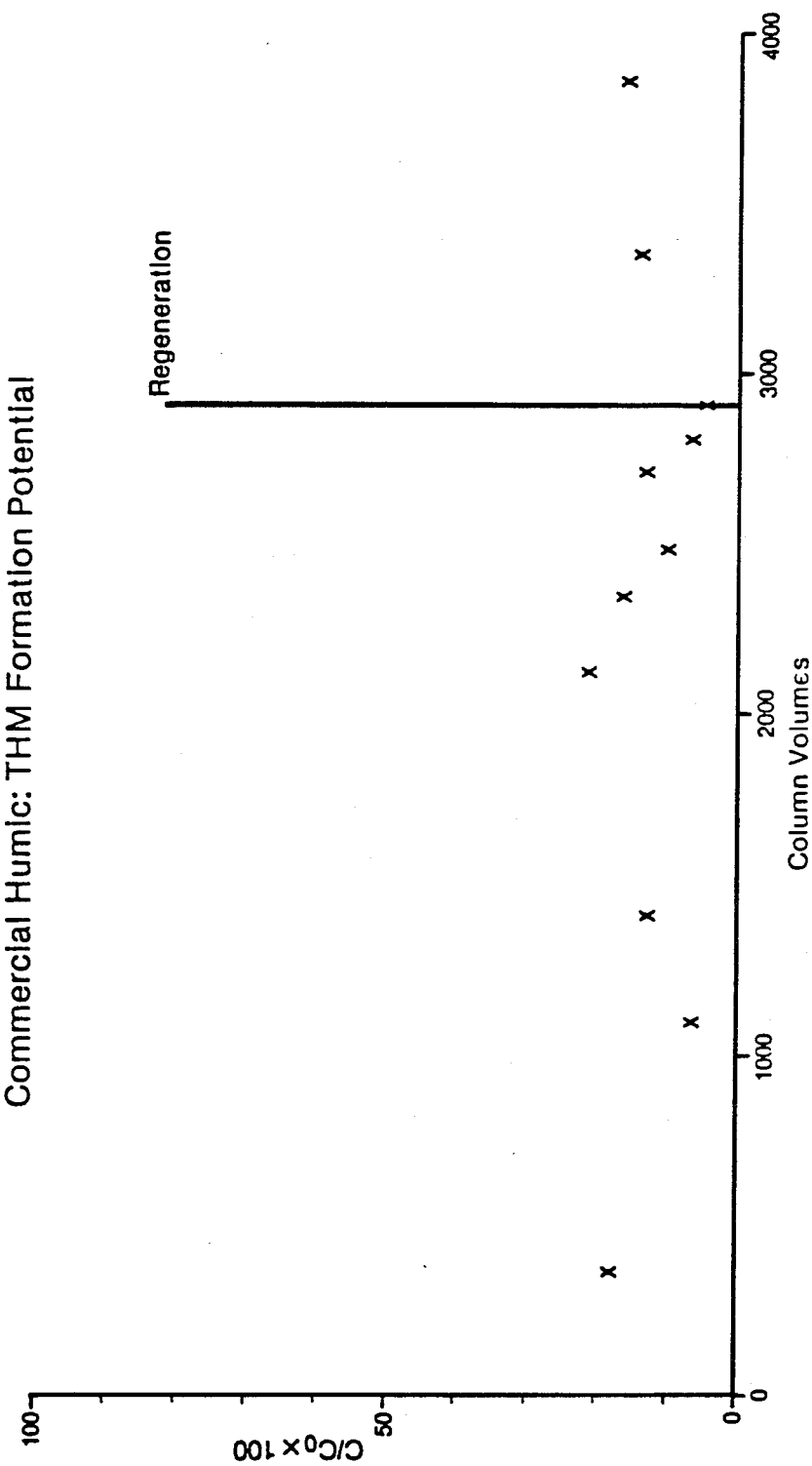
FIG. 6 is a plot of THM formation potential (Example 4)

Samples saved for total THM analysis were chlorinated at 10 mg cl/L and allowed to incubate for seven days. A plot of the THM formation potential is shown in FIG. 6. Since the solution used was prepared from commercial humic and organic-free water, there was no bromide ion present to form brominated organics. Therefore, only chloroform was observed. The level of chloroform was found never to exceed 25 percent of that formed from the chlorination of the original influent humic acid solution. this fact indicates (1) that the sorbent is doing a good job in removing THM precursors from commercial humic solutions and (2) that that fluorescence is a good indicator of the amount of material coming through the column.

An experiment in removing the humic from the spent column was then attempted. The column was vigorously backflushed with deionized water. A small portion of the color was removed, but the humic appeared to be bound to fine particles of the sorbent material. The column was then backflushed with four liters of 0.01N NaOH solution. The first liter of NaOH solution flush was very dark indicating removal of some humic. However, the third and fourth liters of NaOH were relatively clear. The column itself remained very dark and appeared as if about 10 percent or less of the humic was removed by the NaOH backflush.

Natural Waters—Black Lake and Florida Groundwaters (Preston Groundwater #1)

Two natural waters were obtained; one from Black Lake, Va., which had a dark brown color and a TOC of 10.6 ppm and the second from a Florida groundwater (Preston Groundwater #1) with a yellow-orange color and a TOC of 5.6 ppm. These waters were passed through identical 2.1 cm diameter×4.2 cm columns with an empty bed volume of 14 mL. The flow rate was approximately 2 mL/min.

Figure 7:
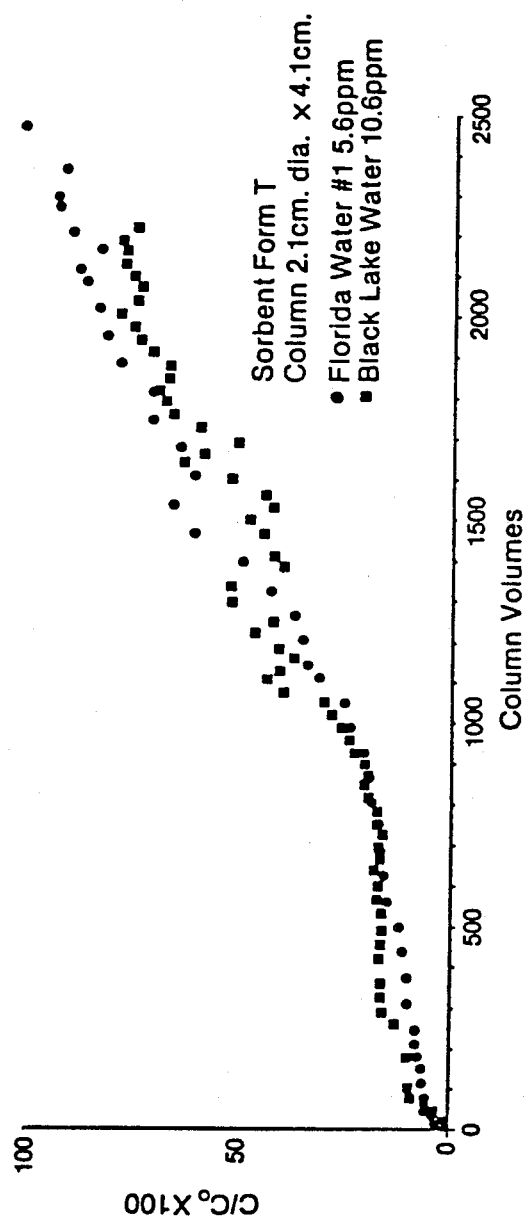
FIG. 7 is a graph illustrating natural waters humic acid: fluorescence breakthrough (Example 4)

The fluorescence breakthrough curves for these two waters are shown in FIG. 7. Agreement between the two curves is very good despite the difference in TOC value between the two waters. It should be noticed that well over 1000 column volumes of each water passed through the columns before 50 percent fluorescence breakthrough was obtained. The Form T organoclay appears to be very effective in removing the organics form the water; particularly when compared to other potential sorbents.

Fractions were collected from each of the columns for total THM analyses. The results from the Florida water chlorination are shown in Table 4 with the Black Lake water chlorination results shown in Table 5. It is very interesting to follow the formation of the brominated THM's. Very little brominated species were formed from the fractions collected up through 400 to 500 column volumes. Subsequently, there follows a sharp rise in the amount of brominated species. Such an observation leads to the conclusion that the bromide ion is being selectively removed from the water by the sorbent. The bromide ion then "breaks through" and becomes a factor in THM formation.

Figure 8:
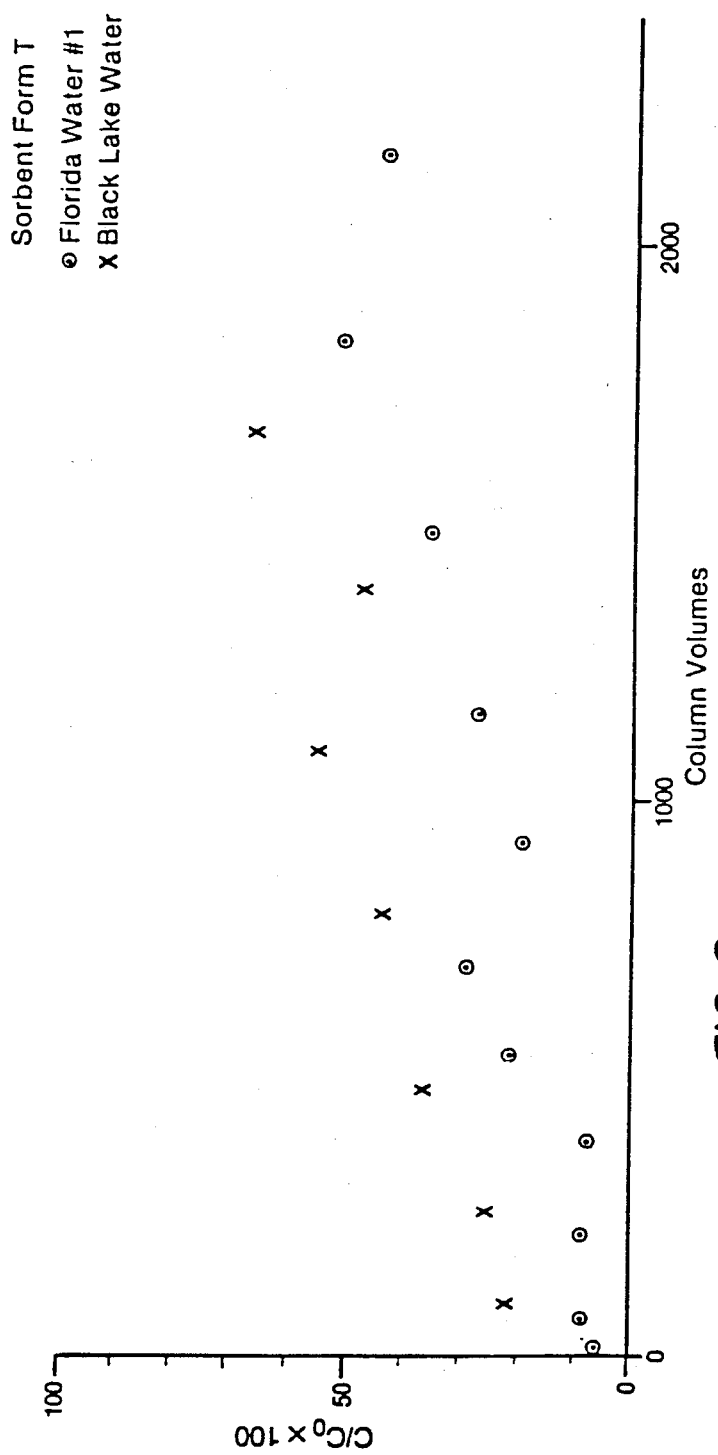
FIG. 8 is a graph of natural waters total THM breakthrough (Example 4)

A plot of total THM breakthrough for both waters is shown in FIG. 8. The Florida water follows the fluorescence breakthrough very well. The Black Lake water breakthrough was 75 percent at 64 column volumes and 82 percent at 18 column volumes indicating very little regeneration of column capacity had occurred.

The Black Lake column also was rinsed with deionized water, 0.001N NaOH and 0.01N NaOH solutions. Each rinse resulted in very dark solutions coming from the column for a short time before the effluent began to clear. The column was restored with deionized water and Black Lake water started again. The fluorescence breakthrough started at about 44 percent and then leveled off at 53 to 55 percent up to 350 column volumes. Some of the capacity of the column has been restored, but it was not restored to the original level. A few batch extractions with 0.1 and 1M NaOH indicate much higher extraction efficiencies indicating regeneration feasibility.

TABLE 4

RESULTS OF BLACK LAKE WATER CHLORINATION* - TOTAL THM'S

| Fraction | Column Volume | Concentration (ppb) | | | | TTHM's | $C/C_o \times 100$ |
| --- | --- | --- | --- | --- | --- | --- | --- |
| | | $CHCl_3$ | $CHBrCl_2$ | $CHBr_2Cl$ | $CHBr_3$ | | |
| 5 | 15 | 102 | 4.2 | 0.1 | — | 107 | 7.3 |
| 6 | 100 | 306 | 9.6 | 2.4 | — | 318 | 21.9 |
| 8 | 265 | 357 | 8.9 | 0.2 | — | 366 | 25.2 |
| 100 | 481 | 512 | 9.5 | — | — | 522 | 36.0 |
| 300 | 800 | 571 | 57 | 8.6 | — | 637 | 43.9 |
| 500 | 1090 | 720 | 71 | 9.0 | — | 800 | 55.1 |
| 800 | 1382 | 601 | 69 | 12.0 | — | 682 | 47.0 |
| 1025 | 1662 | 875 | 75 | 7.5 | — | 956 | 65.9 |
| Raw Black Lake Water | — | 1400 | 49 | 2.2 | — | 1451 | — |

*All chlorinated at 50 mg/L

TABLE 5

RESULTS OF FLORIDA WATER CHLORINATION* STUDY - TOTAL THM'S

| Fraction | Column Volume | Concentration (ppb) | | | | TTHM | $C/C_o \times 100$ |
| --- | --- | --- | --- | --- | --- | --- | --- |
| | | $CHCl_3$ | $CHBrCl_2$ | $CHBrCl_2$ | $CHBr_3$ | | |
| 5 | 15 | 39.0 | 1.8 | 0.4 | — | 41 | 6.1 |
| 24 | 72 | 53.3 | 2.3 | — | — | 56 | 8.2 |
| 36 | 229 | 55.4 | 1.7 | — | — | 57 | 8.5 |
| 100 | 393 | 37.4 | 11.0 | 0.7 | — | 49 | 7.3 |
| 200 | 547 | 28.0 | 45 | 48 | 24 | 144 | 21.3 |
| 300 | 704 | 27.2 | 57 | 66 | 46 | 197 | 29.1 |
| 450 | 926 | 62.7 | 43 | 25 | — | 130 | 19.3 |
| 600 | 1158 | 108 | 46 | 25 | 4 | 183 | 27.1 |
| 800 | 1428 | 150 | 56 | 31 | 5 | 232 | 35.8 |
| 1000 | 1829 | 273 | 53 | 17 | 2.0 | 345 | 51.0 |
| 1200 | 2158 | 207 | 61 | 26 | 1.7 | 295 | 43.7 |
| 1400 | 2621 | 346 | 67 | 23 | 2.1 | 438 | 64.9 |
| Florida Water** | — | 560 | 73 | 13 | — | 676 | — |

*Chlorinated at 20 mg/L
**Chlorinated at 50 mg/L has a higher initial total THM breakthrough than fluorescence but at about 1600 column volumes the agreement is very good. The value for $C_o$ in FIG. 8 in the THM value was obtained by chlorinating the raw water.

Regeneration of both columns was attempted by flushing with first deionized tap water followed by dilute NaOH solutions. Backflushing the Florida column with deionized tap water removed a very yellow fraction for the first 500 mL. Visible color removal continued until 1.5 to 2 liters of water had been passed through the column. The column was rinsed with organic-free water and the Florida water restarted. Fluorescence breakthrough occurred within 10 column volumes. The Florida water column was then rinsed with 500 mL of 0.01 NaOH followed by one liter of 0.01N NaOH. The column was rinsed with deionized water until the effluent pH returned to the 6.5 to 7.0 range. The Florida water was restarted and 40 percent breakthrough was observed immediately. The fluorescence Natural Waters—Preston Groundwater #2 Florida Tap Water and Resources Reclamation Water Three water samples from Florida were obtained for column studies. Each was passed through identical 2.1 cm diameter $\times$ 4.2 cm columns at flow rates of approximately 3 mL/min.

Figure 9:
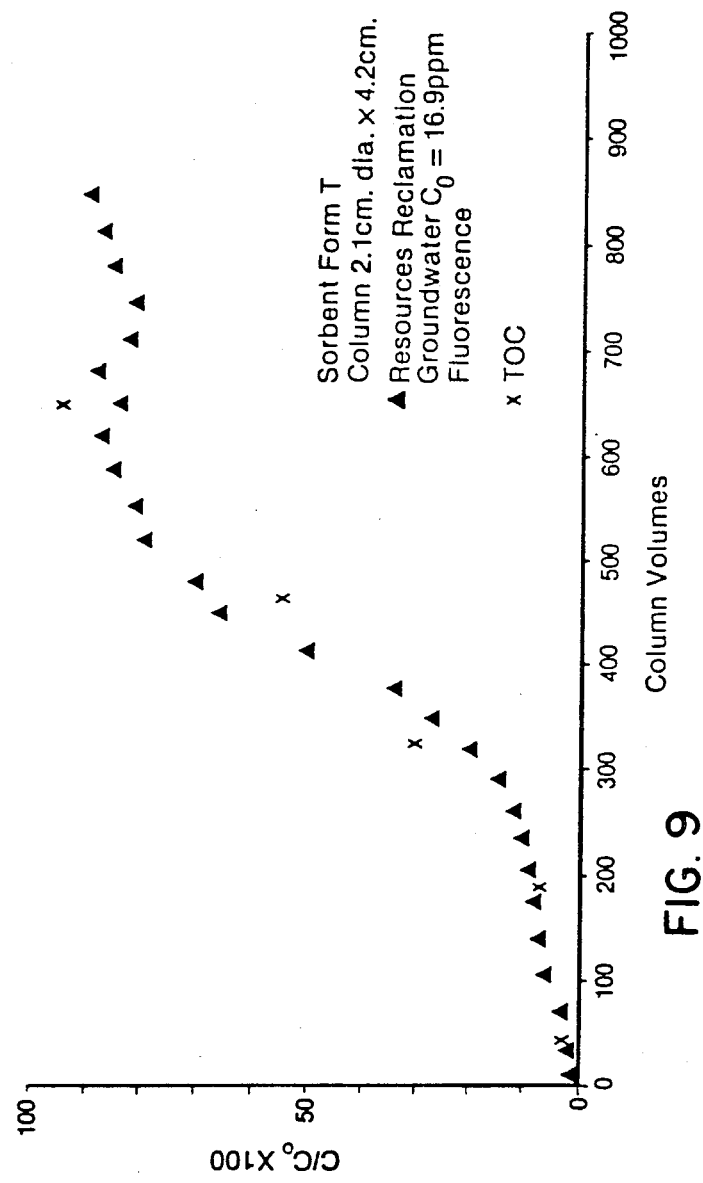
FIG. 9 depicts resources reclamation groundwater: fluorescence, and TOC breakthrough curves (Example 4)

The fluorescence breakthrough curve for the Resources Reclamation Water is shown in FIG. 9. This water is very yellow in color and has a relatively high TOC content at 17 ppm. Breakthrough occurs for this water much earlier, approximately 500 column volumes compared to 2500 column volumes for the previous waters; presumably due to the high organic content. As can be observed from FIG. 9, the agreement between total organic carbon (TOC) content and fluorescence is very good. This observation indicates that fluorescence is a good means of following natural organics in water.

Figure 10:
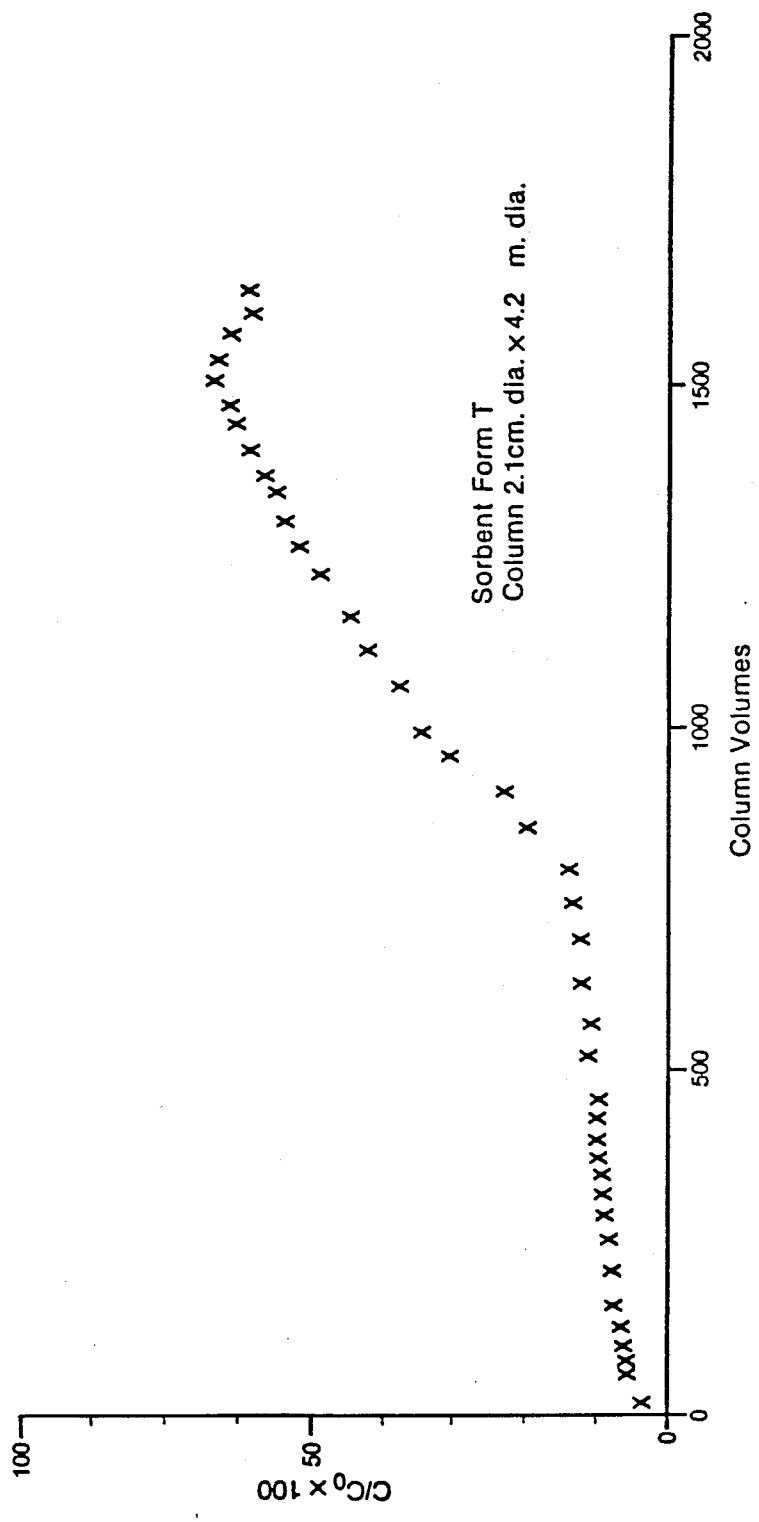
FIG. 10 is a graph of fluorescence breakthrough for Preston Groundwater #2 (Example 4)

The fluorescence breakthrough curve for the Preston Groundwater #2 is shown in FIG. 10. This water is from the same source as the Florida water discussed in the previous section. It has a much lower TOC content at 5.6 ppm than the Resources Reclamation Groundwater. Breakthrough is much slower than the Reclamation water with 60 percent breakthrough at 1500 column volumes.

Figure 11:
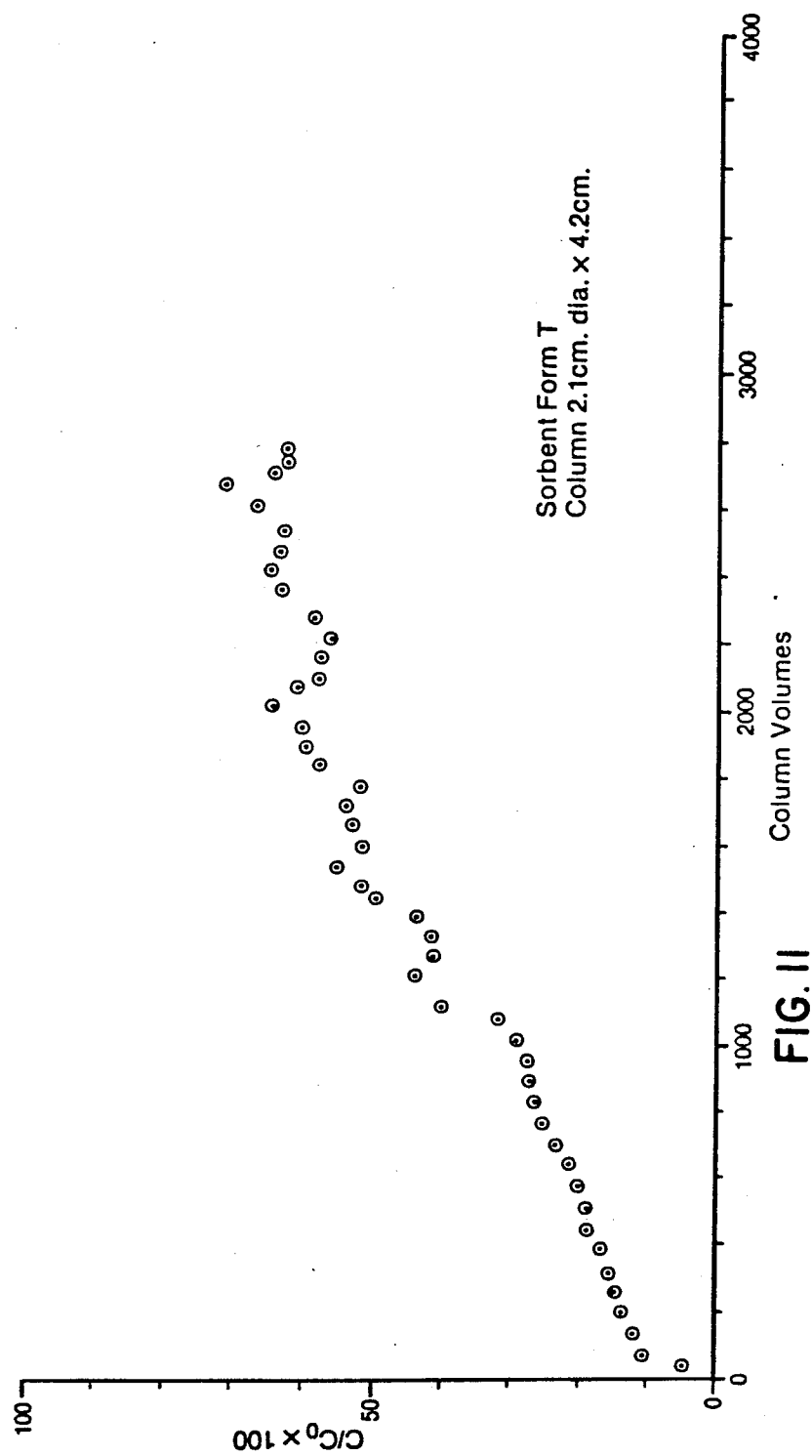
FIG. 11 is a graph of fluorescence breakthrough for Florida Tap water (Example 4)

The fluorescence breakthrough curve for the Florida Tap Water produced from Preston Groundwater #2 is shown in FIG. 11. This water has very little color and lower TOC. It has been chlorinated and has a residual chlorine level of 1 to 1.5 ppm. The initial relative fluorescence is much higher than that seen in the groundwater. However, at 2600 column volumes, the column effluent fluorescence is less than 70 percent of the influent water fluorescence.

Figure 12:
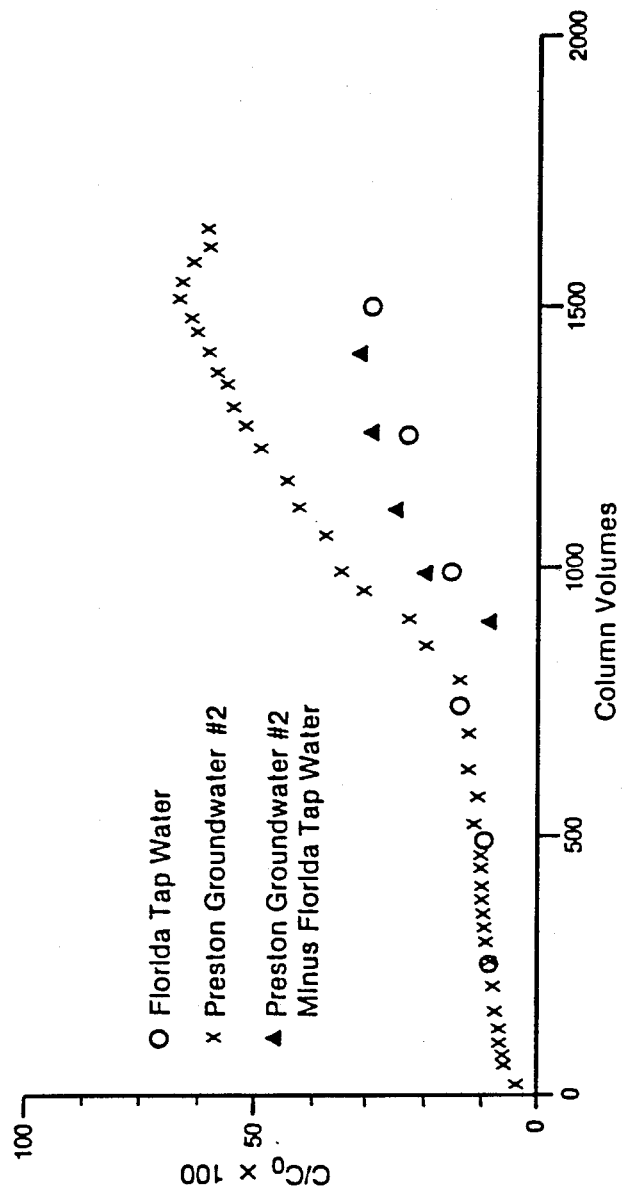
FIG. 12 is a graph of fluorescence breakthrough for Preston Groundwater #2 minus Florida tapwater.

The Preston groundwater is treated with alum to remove approximately forty-five percent of the organics. This type of treatment preferentially removes the high molecular weight humics leaving mainly the low molecular weight fulvics. This would indicate that the humic breakthrough curve for Preston groundwater reproduced in FIG. 12 is most probably the combination of two breakthrough curves. If the breakthrough curve in FIG. 11 for the Miami tap water is assumed to be 100% fulvic acid and is subtracted from the Preston groundwater curve in FIG. 12, the resulting curve could represent the true humic acid fraction breakthrough. This curve more closely resembles what would be expected from true chromatographic behavior.

Conclusions

Figure 13:
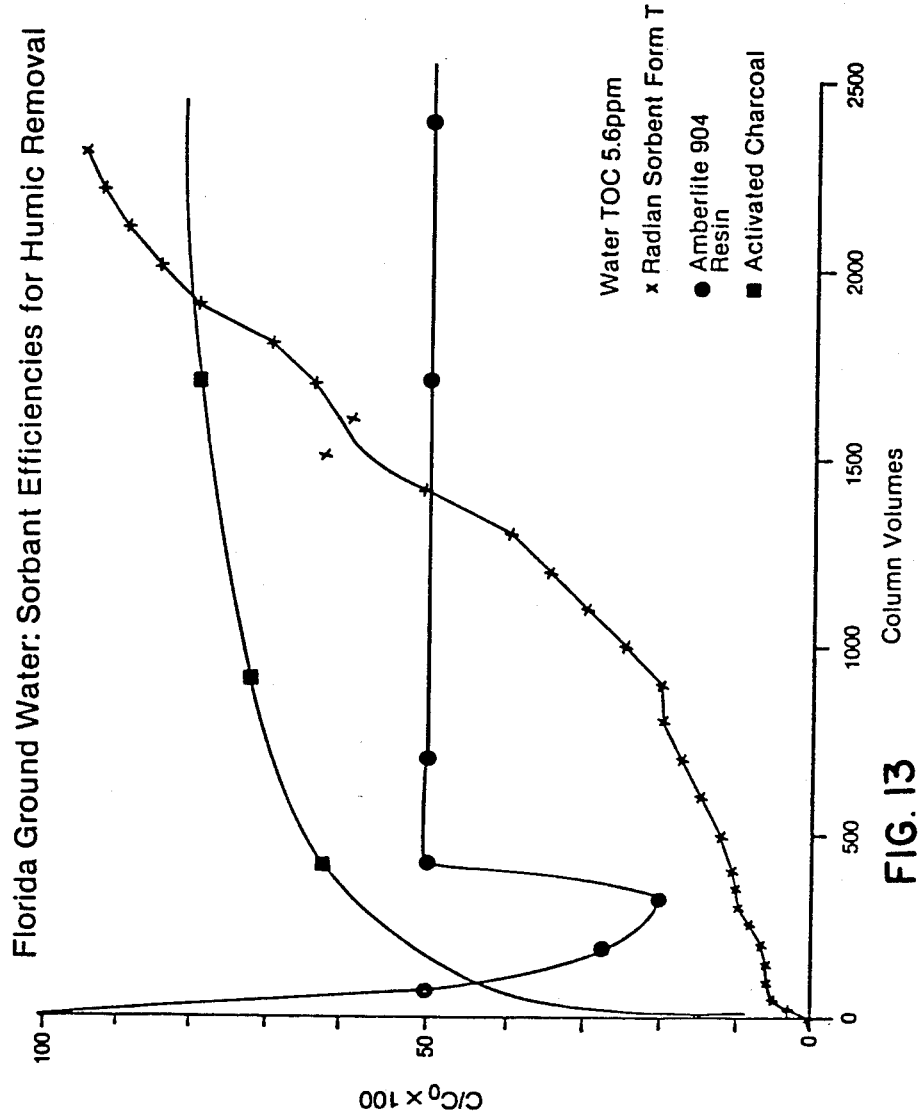
FIG. 13 is a graph of Florida groundwater: sorbent efficiencies for humic removal.
Figure 14:
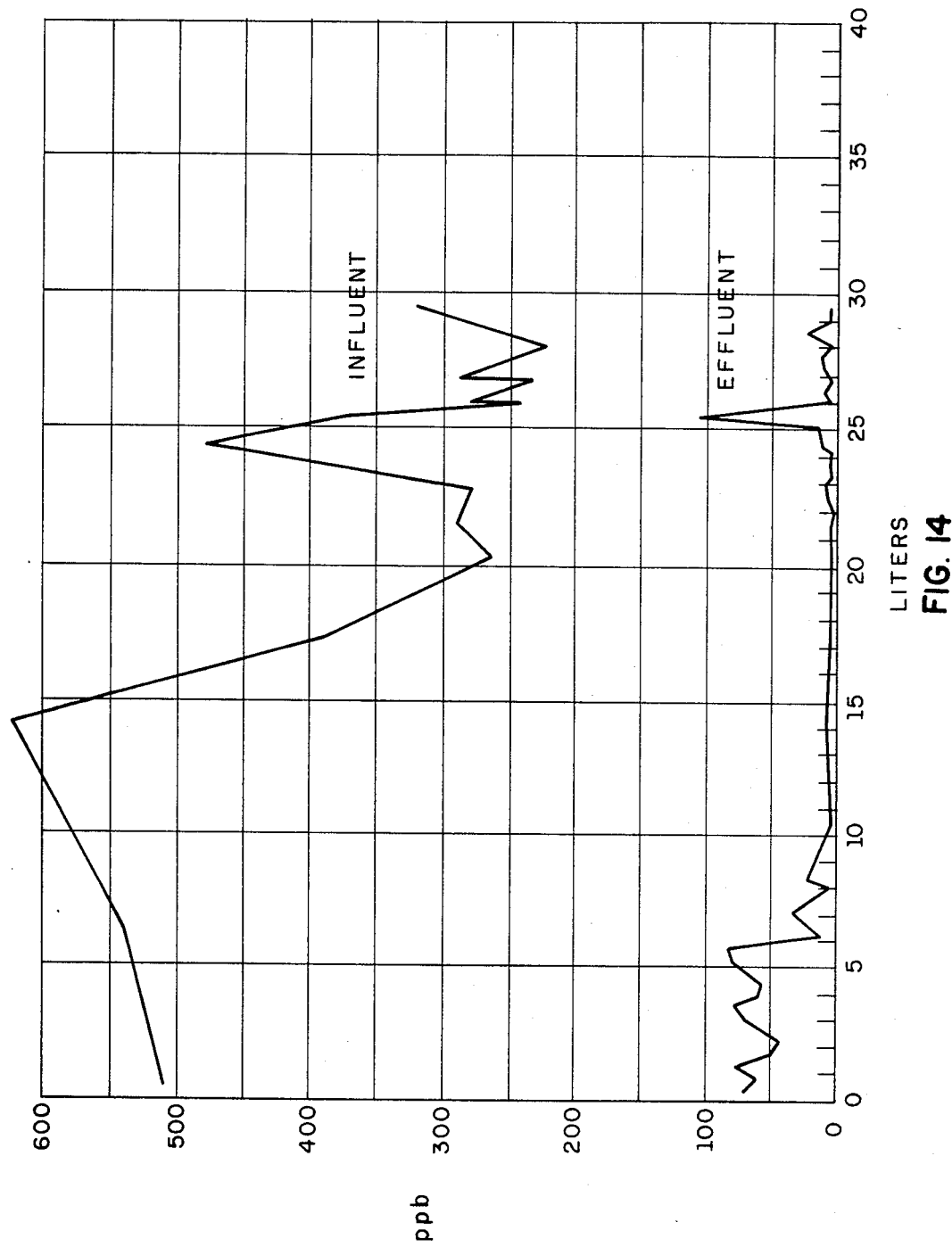
FIG. 14 shows polychlorinated biphenyl (PCB) column removal by dimethyl di(hydrogenated tallow) ammonium bentonite, shown as a function of inlet and outlet concentrations of PCB for exiting fluid volume (Example 11)
Figure 15:
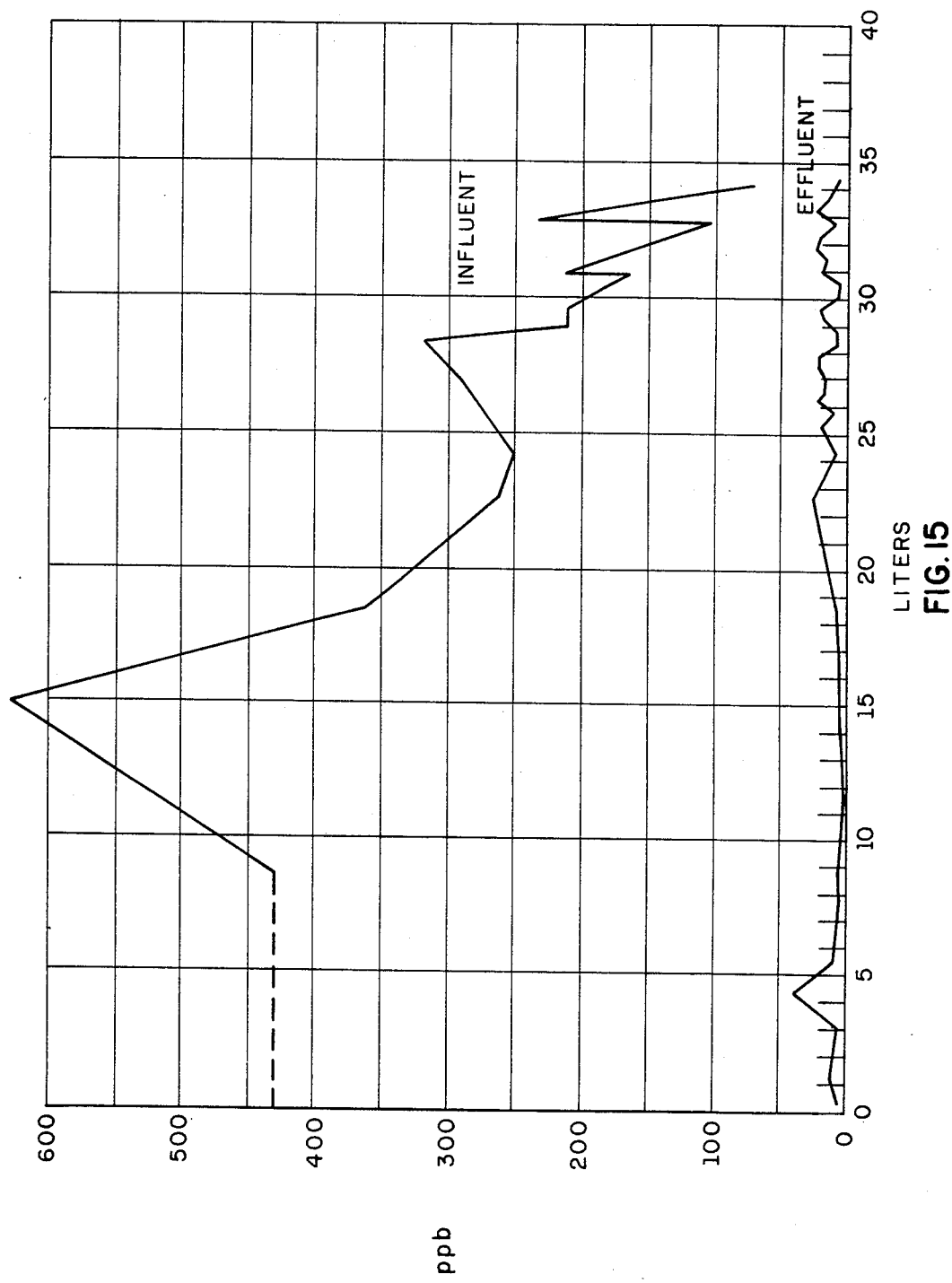
FIG. 15 shows polychlorinated biphenyl (PCB) column removal by a dimethyl benzyl (hydrogenated tallow) ammonium bentonite form of organoclay, shown as a function of inlet and outlet concentrations of PCB for exiting fluid volume (Example 11)
Figure 16:
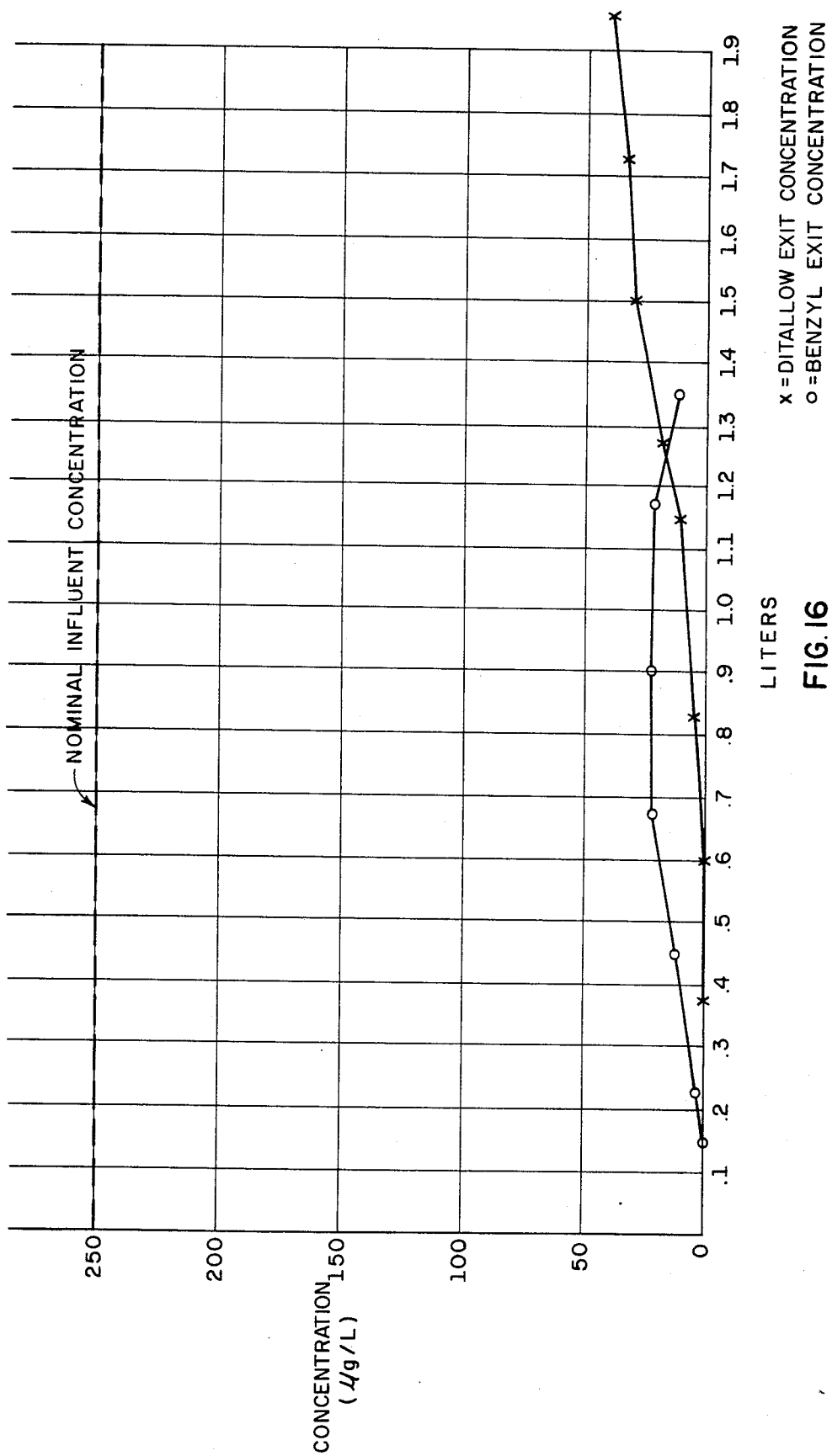
FIG. 16 shows dibromochloropropane (DCBP) column removal by the aforementioned benzyl and ditallow forms of organoclay, shown as a function of inlet and outlet concentrations of DBCP for exiting fluid volume (Example 11)
Figure 17:
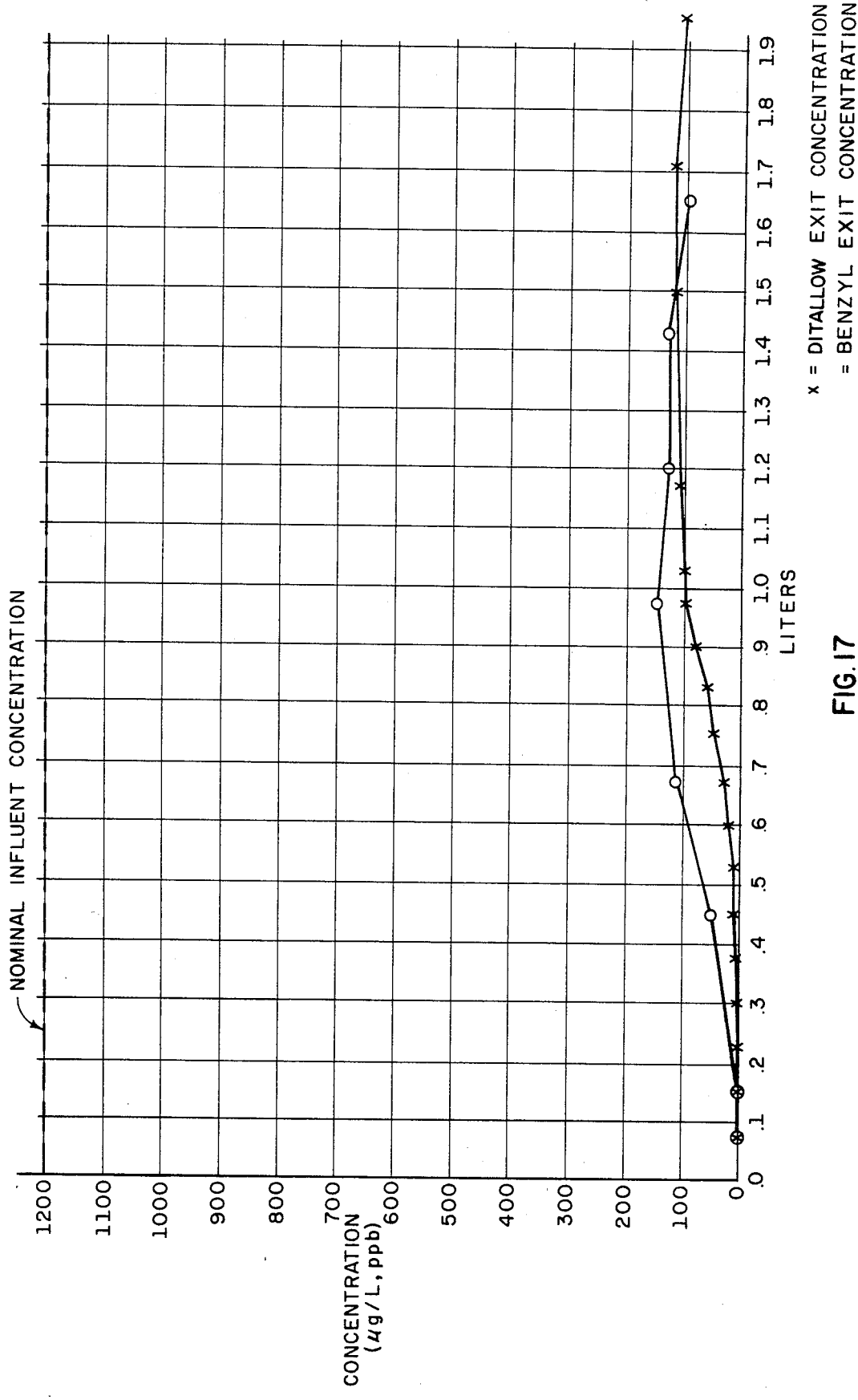
FIG. 17 shows trichloroethylene (TCE) column removal by the aforementioned benzyl and ditallow forms of organoclay, shown as a function of inlet and outlet concentrations of TCE for exiting fluid volume (Example 11).

Dimethyl di(hydrogenated tallow) ammonium bentonite organoclay has been determined to be very effective in the removal of humic acids (i.e., trihalomethane precursors). It has a very good capacity for the removal of the humic species. Based on the Resoruces Reclamation Water TOC of 17 ppm and a breakthrough of 550 column volumes, the capacity of the same organoclay is approximately 0.2 g of organic carbon per 10 g of dry sorbent. Since humic materials are approximately 40 to 50 percent carbon, the capacity of the organoclay is approximately 0.5 g of humics per 10 g of dry sorbent. By comparison, the capacity of Amberlite resin would be approximately the same as this organoclay since the resin only removes 50 percent of the organics from the water. This organoclay, however, would be the preferable sorbent as it removes much more of the organic material through the first 1500 column volumes than the Amberlite resin. (See FIG. 13).

EXAMPLE 5

Several batch sorption experiments have been performed with two forms of higher dialkyl dimethyl organoclay and compared to untreated montmorillonite sorption. These have been conducted with 100:1 solution to solid ratio. The following tables 6, 7 and 8 are a summary of these studies showing results from batch equilibration sorption studies of an untreated montmorillonite, CLAYTONE® 34 and CLAYTONE® 40, respectively.

TABLE 6

| Organic Species | Inlet Concentrations Spiking Level (ppb) (μg/l) | Concentration in Blank (ppb) (μg/l) | 24 Hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 4.95 | 0 | 0 | 13 | 0 | 0 |
| p,p'-DDT | 0.88 | 0 | 0.82 | 0 | 7 | 0.96 | 0 | 0 |
| o,p'-DDT | 1.77 | 0 | 2.11 | 0 | 0 | 2.16 | 0 | 0 |
| p,p'-DDD | 0.75 | 0 | 0.75 | 0 | 0 | 0.88 | 0 | 0 |
| o,p'-DDD | 0.43 | 0 | 0.46 | 0 | 0 | 0.36 | 0 | 16 |
| p,p'-DDE | 0.56 | 0 | 0.68 | 0 | 0 | 0.86 | 0 | 0 |
| o,p'-DDE | 0.17 | 0 | 0.20 | 0 | 0 | 0.15 | 0 | 12 |
| 2,4-Dichlorophenol | 18,000 | 0 | 11,000 | 0 | 39 | 11,000 | 0 | 39 |
| Tetrachloroethylene | 318 | 0.20 | 278 | 2.10 | 13 | 331 | 0.70 | 0 |
| Benzene | $1.35 \times 10^5$ | 0 | $1.35 \times 10^5$ | 0 | 0 | | | |
| Toluene | $5.4 \times 10^4$ | 0 | $4.54 \times 10^4$ | 8 | 16 | | | |
| Methylene Chloride | $5.12 \times 10^5$ | 0 | $4.40 \times 10^5$ | 0 | 14 | | | |

TABLE 7

| Organic Species | Inlet Concentrations Spiking Level (ppb) (μg/l) | Concentration in Blank (ppb) (μg/l) | 24 Hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'-DDD | 0.75 | 0 | 0 | 0 | 100 | 0 | 0 | 100 |
| o,p'-DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 0 | 99 |
| Tetrachloroethylene | 318 | 0.20 | 25 | 0.3 | 92 | 24 | 0.2 | 92 |
| Benzene | $13.5 \times 10^5$ | 0 | 5400 | 0 | 96 | | | |
| Toluene | $5.4 \times 10^4$ | 0 | 2160 | 0 | 96 | | | |
| Methylene Chloride | $5.12 \times 10^5$ | 0 | $1.08 \times 10^5$ | 0 | 79 | | | |

TABLE 8

| Organic Species | Inlet Concentrations Spiking Level (ppb) (μg/l) | Concentration in Blank (ppb) (μg/l) | 24 Hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'-DDD | 0.75 | 0 | 0 | 0 | 100 | 0 | 0 | 100 |
| o,p'-DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 9 | 99 |
| Tetrachloroethylene | 318 | 0.20 | 27 | 0.3 | 92 | 25 | 0.30 | 92 |
| Benzene | $1.35 \times 10^5$ | 0 | 3420 | 0 | 76 | | | |
| Toluene | $5.4 \times 10^4$ | 0 | 1620 | 0 | 97 | | | |
| Methylene Chloride | $5.12 \times 10^5$ | 0 | $1.13 \times 10^5$ | | 78 | | | |

It can be seen that extremely efficient removal occurs for all of the listed organices with the organoclays. The analyses for the majority of compounds in Tables 5, 7 and 8 were conducted by standard gas chromatographic techniques. The data for benzene, toluene, methylene chloride in these tables are much less accurate because the measurements were conducted by determining only the total organic carbon concentration.

EXAMPLE 6

The following Table 9 gives an initial comparison of literature values of sorption capacities of activated charcoal for several organic compounds and sorption capacities from experimental data for the dimethyl di(hydrogenated tallow)amine-bentonite form of the organoclay for these organic compounds. The data for charcoal was taken from EPA Report 600/8-80-23 and for the organoclay from data based on single experimental value per compound.

TABLE 9

| SORPTION CAPACITIES (mg/g) | | |
|---|---|---|
| Organic Compound | Charcoal | Organoclay |
| Benzene | 0.1 | 18 |
| Toluene | 25.0 | 6 |
| Methylene Chloride | 1.2 | 49 |

EXAMPLE 7

The superiority of the organoclay for sorption of organics was further investigated. The sorption of three forms of organoclay at various loading rates for 12 priority organics were compared with activated charcoal in laboratory experiments and these results are shown in the following Table 10.

TABLE 10

| Concentration of Organic μg/l(ppb) | Clay Type Clay Dose (mg/L): | PERCENTAGE OF SORPTION | | | | | | | | | Carbon |
|---|---|---|---|---|---|---|---|---|---|---|---|
| | | Benzyl | | | Ditallow | | | Ethyl Hydroxy | | | |
| | | 130 | 660 | 1300 | 130 | 660 | 1300 | 130 | 660 | 1300 | 130 |
| 1,000 | Chloroform | 64 | 49 | 56 | 47 | 55 | 43 | 42 | 49 | 51 | 27 |
| 1,000 | 1,2 Dichloroethane | 46 | 36 | 50 | 48 | 49 | 42 | 34 | 29 | 36 | 40 |
| 1,000 | 1,1,1 Trichlorethane | 60 | 55 | 54 | 40 | 49 | 40 | 36 | 43 | 45 | 30 |
| 1,000 | Trichloroethylene | 27 | 24 | 25 | 12 | 43 | 9 | 5 | 13 | 22 | 86 |
| 1,000 | Tetrachlorethylene | 85 | 46 | 74 | 47 | 51 | 60 | 11 | 39 | 60 | 92 |
| 700 | 2 Nitrophenols | 84 87 | 99 96 | ND | 27 | 92 87 | 97 94 | 49 84 | 91 95 | 97 96 | 85 |
| 750 | Pentachlorophenol | ND | ND | ND | ND | ND | ND | ND 94 | 92 | ND | 94 |
| 400 | Dimethyphthalate | 85 | ND | ND | 92 94 | ND | ND | 70 | ND | ND | 92 |
| 400 | Lindane | 99.7 93 | ND | ND | 99.9 85 | ND 98 | ND | 99.9 | ND | ND | — |
| 100 | Arochlor 1254 | 40 29 | 90 88 | 95 94 | 88 77 | 98 90 | 98 95 | 81 74 | 84 65 | 92 89 | 99.7 |
| 15 | Ethyl Benzene | 29 | 16 | 22 | 13 | 24 | 71 | 8 | 16 | — | — |

ND = Not Detected
"Benzyl" is dimethyl benzyl (hydrogenated tallow) ammonium bentonite.
"Ditallow" is dimethyl di(hydrogenated tallow) ammonium bentonite.
"Ethyl Hydroxy" is methyl bis (2-hydroxyethyl) octodecyl ammonium bentonite.

EXAMPLE 8

Trihalomethane removal has been tested through chlorination of both synthetic organic water and natural water. The following Table II shows the results of trihalomethane removal for a natural water.

TABLE 11

| Chlorinated Lake Travis Water | $CHCl_3$ | $CHCl_2Br$ | $CHClBr_2$ | $CHBr_3$ | THM |
|---|---|---|---|---|---|
| 1 | 18 | 29 | 43 | 20 | 110 |
| 2 | 20 | 28 | 44 | 22 | 114 |
| Mean | 19 | 28.5 | 43.5 | 21 | 112 |
| ditallow* organoclay | | | | | |
| Before 1 | 9.5 | 13 | 17 | 7.7 | 47.2 |
| Before 2 | 10 | 14 | 17 | 5.4 | 46.4 |
| Mean | 9.8 | 13.5 | 17 | 6.6 | 46.8 |
| Removal % | 48.4 | 52.6 | 60.9 | 68.6 | 58.2 |
| benzyl* organoclay | | | | | |
| Before 1 | 2.3 | 1.7 | 0.9 | 0.3 | 5.2 |
| Before 2 | 3.9 | 3.2 | 5.3 | 3.5 | 15.9 |
| Mean | 3.1 | 2.4 | 3.1 | 1.9 | 10.6 |
| Removal % | 83.7 | 91.6 | 92.9 | 90.9 | 90.5 |
| Hydroxy* ethyl organoclay | | | | | |
| Before 1 | 2.6 | 7.3 | 15 | 12 | 36.9 |
| Before 2 | 2.9 | 6.0 | 12 | 13 | 33.9 |
| Mean | 2.8 | 6.6 | 13.5 | 12.5 | 35.4 |

TABLE 11-continued

| Chlorinated Lake Travis Water | $CHCl_3$ | $CHCl_2Br$ | $CHClBr_2$ | $CHBr_3$ | THM |
|---|---|---|---|---|---|
| Removal % ditallow* organoclay | 85.3 | 76.8 | 69.0 | 40.5 | 68.4 |
| After 1 | 15 | 18 | 25 | 9.4 | 67.4 |
| After 2 | 13 | 18 | 26 | 12 | 69.0 |
| Mean | 14 | 18 | 25.5 | 10.7 | 68.2 |
| Removal % benzyl* organoclay | 26.3 | 36.8 | 41.4 | 49.0 | 39.1 |
| After 1 | 14 | 19 | 28 | 7.9 | 66.9 |
| After 2 | 13 | 14 | 18 | 6 | 51.0 |
| Mean | 13.5 | 16.5 | 22 | 7.0 | 59.0 |
| Removal % hydroxy* ethyl organoclay | 28.9 | 42.1 | 49.4 | 66.7 | 47.3 |
| After 1 | 16 | 21 | 32 | 14 | 83 |
| After 2 | 17 | 25 | 35 | 16 | 93 |
| Mean | 16.5 | 23 | 33.5 | 15 | 88 |
| Removal % | 13.2 | 19.3 | 23.0 | 28.6 | 21.4 |

*Terms have same meaning as in Table 10.

EXAMPLE 9

These are results of removal of organics before chlorination and post-chlorination sorption for three forms of organoclay based on post weight bases, concentration in ug/L. The earlier results from a study of trihalomethane removal from synthetic water by the ditallow form of organo clay ae shown in following Table 12.

TABLE 12

|  | $CHCl_3$ | $CHCL_2Br$ | $CHCLBr_2$ | $CHBr_3$ | TTHM |
|---|---|---|---|---|---|
| Synthetic water mg/L | 111 | 73 | 45 | 5.3 | 234 |
| Before Chlorination, % removal | 74 | 77 | 76 | 77 | 75 |
| After chlorination, % removal | 31 | 57 | 76 | 78 | 45 |
| Supplemented Lake Travis water, mg/L | 167 | 85 | 42 | 3.2 | 297 |
| Before chlorination, % removal | 58 | 67 | 83 | 84 | 63 |

EXAMPLE 10

In the following Tables 13 and 14, the removal efficiencies of the ditallow, benzyl and hydroxy ethyl organoclay are shown. Table 14 shows the sorbent THM removal efficiencies using synthetic water without bromide addition. The data is based on the average of replicate experiments. The target level that the Environmental Protection Agency has set is 100 ppb. These experiments would indicate that the invention is close to the standard.

TABLE 13

|  | $CHCl_3$ | $CHCl_2Br$ | $CHClBr_2$ | $CHBr_3$ | TTHM |
|---|---|---|---|---|---|
| Chlorinated synthetic water composition, mg/L | 183 | 30 | 0 | — | 217 |
| Treatment Before Chlorination |  |  |  |  |  |
| Ditallow* Organoclay, % Removal | 90.0 | 83.7 | 91.3 | — | 89.0 |

TABLE 13-continued

|  | $CHCl_3$ | $CHCl_2Br$ | $CHClBr_2$ | $CHBr_3$ | TTHM |
|---|---|---|---|---|---|
| Benzyl* Organoclay, % Removal | 86.3 | 79.0 | 55.1 | — | 84.7 |
| Hydroxy Ethyl* Organoclay, % Removal | 71.9 | 33.3 | 7.7 | — | 65.3 |
| Treatment After Chlorination |  |  |  |  |  |
| Ditallow* Organoclay, % Removal | 17.5 | 11.7 | 25.2 | — | 16.8 |
| Benzyl* Organoclay, % Removal | 12.0 | 8.3 | 40.1 | — | 12.0 |
| Hydroxy Ethyl* Organoclay, % Removal | 6.0 | 8.3 | 22.7 | — | 6.6 |

*Terms have same meaning as in Table 10.

TABLE 14

| CHLOROFORM REDUCTION, %* | | | |
|---|---|---|---|
| Sorbent Form | Ditallow** Organoclay | Benzyl** Organoclay | Hydroxy Ethyl** Organoclay |
| Treatment before chlorination | 91.0 | 88.1 | 71.7 |
| Treatment after chlorination | 21.1 | 13.8 | −3.6 |

*Average of replicate experiments.
**Terms have same meaning as in Table 10.

EXAMPLE 11

Another concern of the Environmental Protection Agency in the area of water treatment involves ground and surface water contamination by benzene, tetrachlorethylene, trichloroethylene, carbon tetrachloride, 1,1,1-trichloroethane, 1,2-dichloroethane, vinyl chloride, methylene chloride, chlorinated benzenes and dichloroethylenes. These compounds can be successfully removed by using organoclay as an absorbent. The organoclay can be applied in these applications in two ways. One way is through the continuous flow through columns. another is through batch addition to clarifiers. FIGS. 14, 15, 16 and 17 illustrate experimental results from the column removal of polychlorinated biphenyls, trichloroethylene, and dibromochloropropane by benzyl and ditallow forms of organoclay. These graphs show conclusive removal.

While the invention has been particularly set forth in terms of specific embodiments thereof, it will be understood in view of the present disclosure, that numerous variations upon the invention will now be enabled to those skilled in the art, which variations yet reside within the scope of the present teaching. Accordingly, the invention is to be broadly construed, and limited only by the scope and spirit of the claims now appended hereto.

What is claimed is:

1. A method of removing organic contaminants from an aqueous composition contaminated therewith, comprising:
 (a) contacting an aqueous composition containing organic contaminants selected from the group consisting of substantially water insoluble organic contaminants, aliphatic contaminants, humics and mixtures of the same with a sufficient amount of an organoclay which is the previously prepared reaction product of a quaternary amonnium salt and a smectite-type clay, for a sufficient amount of time to adsorb a substantial portion of contaminant and to form an aqueous organoclay admixture; and (b) separating the organoclay and aqueous composition from each other.

2. The method of claim 1, wherein the contacting step is performed in a packed tower.

3. The method of claim 1, wherein the contacting step is performed in a fluidized bed.

4. The method of claim 1, wherein the contacting step is performed in a stirred bed.

5. The method of claim 1, wherein the organoclay is admixed with a particulate diluent.

6. The method of claim 5, wherein the diluent is anthracite.

7. The method of claim 1, wherein the separating step comprises filtering the organoclay from the admixture.

8. The method of claim 1, wherein the separating step comprises flocculating the organoclay from the admixture.

9. The method of claim 1, wherein the separating step comprises centrifuging the organoclay from the admixture.

10. The method of claim 1, wherein the organic contaminant is a polychlorobiphenyl (PCB).

11. The method of claim 1, wherein the organic contaminant is dibromochloropropane (DBCP).

12. The method of claim 1, wherein the organic contaminant is a precursor to a toxic substance.

13. The method of claim 1, wherein the organic contaminant is humic acid.

14. The method of claim 13, further comprising contacting the separated organoclay with an effective amount of caustic to neutralize the acid adsorbed thereon to produce a regenerated organoclay.

15. The method of claim 1, wherein the organic contaminant is chelated with metals.

16. The method of claim 1, wherein the organic contaminant is oil.

17. The method of claim 1, wherein the organoclay is about 40 to 60 mesh size.

18. The method of claim 1, wherein the organoclay is a higher dialkyl dimethyl ammonium organoclay.

19. The method of claim 1, wherein the organoclay is a dimethyl benzyl(hydrogenated tallow)ammonium clay.

20. The method of claim 1, wherein the organoclay is a dimethyl di(hydrogenated tallow)ammonium clay.

21. The method of claim 1, wherein the amount of organoclay is at least about 40% by weight of the amount of organic contaminant.

22. The method of claim 1, wherein the amount of organoclay is in the range of from about 40% to 500% by weight of the amount of organic contaminant.

* * * * *